US008517139B2

(12) United States Patent  
Komatsu et al.

(10) Patent No.: US 8,517,139 B2
(45) Date of Patent: Aug. 27, 2013

(54) TRACTOR

(75) Inventors: Masakazu Komatsu, Osaka (JP); Keiichi Hayashi, Osaka (JP)

(73) Assignee: Yanmar Co., Ltd., Osaka (JP)

(*) Notice: Subject to any disclaimer, the term of this patent is extended or adjusted under 35 U.S.C. 154(b) by 935 days.

(21) Appl. No.: 10/597,506

(22) PCT Filed: Aug. 20, 2004

(86) PCT No.: PCT/JP2004/012000
§ 371 (c)(1),
(2), (4) Date: Oct. 5, 2007

(87) PCT Pub. No.: WO2005/073008
PCT Pub. Date: Aug. 11, 2005

(65) Prior Publication Data
US 2008/0173495 A1    Jul. 24, 2008

(30) Foreign Application Priority Data

| Jan. 29, 2004 | (JP) | 2004-021916 |
| Jan. 29, 2004 | (JP) | 2004-021917 |
| Feb. 12, 2004 | (JP) | 2004-035222 |
| Feb. 12, 2004 | (JP) | 2004-035345 |
| Feb. 12, 2004 | (JP) | 2004-035346 |
| Feb. 16, 2004 | (JP) | 2004-038150 |
| Feb. 24, 2004 | (JP) | 2004-047452 |

(51) Int. Cl.
*B60K 17/04* (2006.01)
(52) U.S. Cl.
USPC ............ 180/344; 180/233; 180/6.66
(58) Field of Classification Search
USPC ........................ 180/233, 240, 247
See application file for complete search history.

(56) References Cited

U.S. PATENT DOCUMENTS 3,074,285 A    1/1963    Hausmann
4,258,587 A    3/1981    Morino
(Continued)

FOREIGN PATENT DOCUMENTS

EP    1 334 861    8/2003
EP    1 555 190    7/2008
(Continued)

OTHER PUBLICATIONS

The International Search Report dated Nov. 16, 2004.
(Continued)

*Primary Examiner* — Tony Winner
*Assistant Examiner* — Jacob Knutson
(74) *Attorney, Agent, or Firm* — Sterne, Kessler, Goldstein & Fox P.L.L.C.

(57) ABSTRACT

With regard to a tractor having a high-powered engine, universal joints must be enlarged, whereby the attachment work of a power transmission shaft becomes difficult. Furthermore, the kind of the universal joints to be used is limited, thereby being inconvenient. Therefore, a tractor is constructed so that a transmission casing is arranged in a rear portion of a vehicle body, a front axle casing is arranged in the front portion of the vehicle body, and power from an engine is transmitted from an output shaft supported by the transmission casing through a power transmission shaft to an input shaft supported by the front axle casing. The tractor is characterized in that a gear casing is disposed between the transmission casing and the front axle casing, the output shaft of the transmission casing and an input shaft of the gear casing are arranged on a same line and connected to each other, and the input shaft of the front axle casing and an output shaft of the gear casing are arranged on a same line and connected to each other.

20 Claims, 32 Drawing Sheets

(56) References Cited

U.S. PATENT DOCUMENTS

| | | | |
|---|---|---|---|
| 4,628,768 A * | 12/1986 | Omura et al. | 74/745 |
| 4,727,759 A | 3/1988 | Yamaoka et al. | |
| 4,834,478 A * | 5/1989 | Stevens et al. | 305/124 |
| 6,758,301 B2 * | 7/2004 | Shiba et al. | 180/383 |
| 7,089,824 B2 * | 8/2006 | Nakatani et al. | 74/730.1 |
| 2006/0048977 A1 * | 3/2006 | Akashima et al. | 180/6.6 |

FOREIGN PATENT DOCUMENTS

| | | |
|---|---|---|
| GB | 2 122 286 | 1/1984 |
| JP | S48-041393 Y | 12/1973 |
| JP | S50-032449 U1 | 4/1975 |
| JP | S53-139443 U1 | 11/1978 |
| JP | S55-113823 U1 | 8/1980 |
| JP | S57-024123 U1 | 2/1982 |
| JP | S58-114946 U1 | 8/1983 |
| JP | S58-134455 U1 | 9/1983 |
| JP | S59-128930 U1 | 8/1984 |
| JP | S61-075062 A | 4/1986 |
| JP | S61-127028 U1 | 8/1986 |
| JP | S61-183729 U1 | 11/1986 |
| JP | S-64-034388 U1 | 3/1989 |
| JP | 68234/1989 | 5/1989 |
| JP | H04-136926 U | 12/1992 |
| JP | 06-270851 A | 9/1994 |
| JP | H08-504144 A | 5/1996 |
| JP | H09-315337 A | 12/1997 |
| JP | H10-316008 A | 12/1998 |
| JP | 2000-072053 A | 3/2000 |
| JP | 2000-102318 A | 4/2000 |
| JP | 2000-198461 A | 7/2000 |
| JP | 2001-055161 A | 2/2001 |
| JP | 2001-122149 A | 5/2001 |
| JP | 2001-253362 A | 9/2001 |
| JP | 2002-054698 A | 2/2002 |
| JP | 2002-068008 A | 3/2002 |
| JP | 2002-193151 A | 7/2002 |
| JP | 2002-316661 A | 10/2002 |
| JP | 2002-337764 A | 11/2002 |
| JP | 2002-349648 A | 12/2002 |
| JP | 2002-362176 A | 12/2002 |
| JP | 2003-002228 A | 1/2003 |
| JP | 2003-040149 A | 2/2003 |
| JP | 2003-048574 A | 2/2003 |
| JP | 2003-159904 A | 6/2003 |
| JP | 2003-531056 A | 10/2003 |
| WO | WO 2004/037628 | 5/2004 |

OTHER PUBLICATIONS

International Search Report for European Application No. EP 04771951.2-2442, European Patent Office, mailed Apr. 28, 2008, 6 pgs.

English Translation fo Japanese Office Action for Japanese Application No. 2004-021916 dated Dec. 18, 2009, 3 pages.

English Translation of Japanese Office Action for Japanese Application No. 2004-021917 dated Mar. 26, 2009, 3 pages.

English Translation of Japanese Office Action for Japanese Application No. 2004-035222 dated Oct. 14, 2009, 2 pages.

English Translation of Japanese Office Action for Japanese Application No. 2004-035345 dated Oct. 15, 2009, 3 pages.

English Translation of Japanese Office Action for Japanese Application No. 2004-038150 dated Sep. 16, 2009, 3 pages.

* cited by examiner (a) (vehicle body side) (outer side)

(b)

TRACTOR

BACKGROUND OF THE INVENTION

1. Field of the Invention

The present invention relates to a tractor having a power transmission mechanism, especially to a tractor having a power transmission mechanism constructed so that a drive sprocket is arranged in a front portion of a crawler traveling unit of a crawler tractor and power is transmitted from an engine to the drive sprocket.

Furthermore, the present invention relates to a tractor having a differential mechanism provided in a traveling vehicle such as a crawler tractor.

Moreover, the present invention relates to a construction of a hydraulic circuit of a traveling vehicle of a tractor. In more detail, the present invention relates to a drain oil passage of a hydraulic circuit of a tractor constructed so that power from an engine is transmitted to a hydraulic clutch type forward/rearward traveling switching device and a main transmission, subsequently transmitted to a sub transmission and changed in speed, and then transmitted to the turning HST so as to control traveling.

Besides, the present invention relates to an art of a track roller of a crawler traveling unit of a tractor so as to support a crawler belt provided in the crawler traveling unit.

2. Description of the Prior Art

Conventionally, there is well known a tractor which is a traveling vehicle having a crawler traveling unit (crawler tractor) for various kinds of agricultural works on a field. The tractor is constructed so that an engine and a front axle casing are arranged in the front portion of the vehicle, and a transmission casing is arranged in the rear portion of the vehicle. Power from the engine is changed in speed in the transmission casing, and then transmitted from an output shaft projected from a power take-off part of the front portion of the transmission casing through a power transmission shaft to an input shaft provided in the rear portion of the front axle casing so as to drive the crawler traveling unit through a differential housed in the front axle casing (for example, see the Patent Literature 1).

With regard to the conventional crawler tractor, the height of the output shaft of the transmission casing is different from that of the input shaft of the front axle casing. Accordingly, the output shaft and the input shaft are connected through universal joints and a propeller shaft so that power can be transmitted though the power transmission shaft. However, with regard to a large tractor having a high-powered engine, the transmission torque also becomes large. Accordingly, the universal joints and the propeller shaft must be enlarged so that the weight thereof is also increased, whereby the attachment work of the power transmission shaft becomes difficult and the cost is increased. Furthermore, the kind of the universal joints to be used is limited, whereby the design is restricted.

Conventionally, with regard to the traveling vehicle traveling by the crawler traveling unit, there is well known a differential mechanism that power from the engine is changed in speed in the transmission, and then inputted to a differential and transmitted to left and right output shafts so as to perform straight travel, and a turning HST is driven by operating a steering wheel and power from the turning HST is transmitted to the differential so as to generate difference of rotation speed between the left and right output shafts, thereby turning travel is performed. With regard to such a differential mechanism, power outputted from the turning HST is adjusted corresponding to operation amount of the steering wheel so as to change the difference of rotation speed between the left and right output shafts, thereby adjusting the turning radius of the vehicle at the time of turning (for example, see the Patent Literature 2).

As mentioned above, with regard to the conventional differential mechanism, power outputted from the turning HST is adjusted corresponding to operation amount of the steering wheel. However, for turning widely by small operation amount in the case of low speed traveling and turning slightly by large operation amount in the case of high speed traveling, or for reducing speed at the time of turning, a complex linkage mechanism is provided between the steering wheel and a speed change shaft of the turning HST or a main speed change lever. As a result, the number of parts increase and assembly work becomes troublesome. Power outputted from the turning HST causes large output loss, whereby the power cannot be used maximally.

Conventionally, with regard to a turning vehicle such as a tractor, power from the engine is transmitted to a hydraulic clutch type forward/rearward traveling switching device and a main transmission, subsequently transmitted to a sub transmission and changed in speed for driving the traveling unit, and then transmitted to the turning HST so as to control traveling, a hydraulic pump is provided so that pressure oil stored in the transmission casing as a pressure oil tank is pressingly sent to each hydraulic device, and the hydraulic pump is driven by the engine. With regard to a hydraulic circuit of such a tractor, pressure oil from the hydraulic pump is cooled by an oil cooler and then supplied to the turning HST. The pressure oil returning from the turning HST is pressingly sent to the hydraulic clutch of the forward/rearward traveling switching device for lubrication, and then returned to the transmission casing (for example, see the Patent Literature 3).

With regard to the conventional tractor, pressure oil cooled by the oil cooler is supplied to the turning HST, and the pressure oil returning from the turning HST is supplied to the hydraulic clutch of the forward/rearward traveling switching device for lubrication. Accordingly, the cooling efficiency is low and the transmission cannot be cooled efficiently. The pressure oil is supplied to the hydraulic clutch, whereby loss of oil pressure is large and sufficient cooling effect cannot be obtained.

Now, conventionally, with regard to the crawler traveling unit, a track roller is rotatably provided between a drive sprocket, transmitting power from a drive source such as the engine to the crawler belt, and an idler (driven sprocket) provided oppositely to the drive sprocket in the traveling direction.

Then, the track roller is provided so as to support the crawler belt wound around the drive sprocket and the driven sprocket, to support the slack of the crawler belt, and to make the transfer of the crawler belt smooth.

By constructing an equalizer rotatably supporting front and rear pair of track rollers on a track frame, large shaking of the vehicle body at the time of riding across a convexity on the field is suppressed.

An example of the crawler traveling unit having such a construction is shown in later-discussed Patent Literature 4.

Concretely, the track roller of the crawler traveling unit is rotatably provided on a support member fixed to a frame or the like of the crawler traveling unit.

In this case, when vibration is caused by unevenness of the traveling surface (field surface) or lag of the crawler belt at the time of traveling for example, the vibration is transmitted from the track roller through the track frame to the vehicle body frame.

As a result, not only is a bad influence exerted on the vehicle but also the vibration shakes the whole crawler traveling unit.

Accordingly, an operator operating a crawler tractor or the like to which the above-mentioned crawler traveling unit is adopted may be interfered with operating and be tired by the vibration.

Then, it is necessary to provide a tractor having a track roller of a crawler traveling unit so as to suppress vibration transmitted from the track roller to the crawler traveling unit and to reduce load on an operator of the crawler tractor having the crawler traveling unit for enabling comfortable operation.

Patent Literature 1: the Japanese Patent Laid Open Gazette 2001-253362
Patent Literature 2: the Japanese Patent Laid Open Gazette 2003-2228
Patent Literature 3: the Japanese Patent Laid Open Gazette 2001-55161
Patent Literature 4: the Japanese Patent Laid Open Gazette 2002-316661

SUMMARY OF THE INVENTION

Problems to be Solved by the Invention

With regard to a large tractor having a high-powered engine, the transmission torque also becomes large. Accordingly, the universal joints and the propeller shaft must be enlarged so that the weight thereof is also increased, whereby the attachment work of the power transmission shaft becomes difficult and the cost is increased.

For turning widely by a small operation amount in the case of low speed traveling and turning slightly by a large operation amount in the case of high speed traveling, or for reducing speed at the time of turning, a complex linkage mechanism is provided between the steering wheel and a speed change shaft of the turning HST or a main speed change lever. Accordingly, the number of parts increase and assembly work becomes troublesome.

With regard to the conventional tractor, pressure oil returning from the turning HST is supplied to the hydraulic clutch of the forward/rearward traveling switching device for lubrication. Accordingly, the cooling efficiency is low and the transmission cannot be cooled efficiently. The pressure oil is supplied to the hydraulic clutch, whereby loss of oil pressure is large and a sufficient cooling effect cannot be obtained.

With regard to the conventional tractor, when vibration is caused by unevenness of the traveling surface (field surface) or lag of the crawler belt at the time of traveling for example, the vibration is transmitted from the track roller through the track frame to the vehicle body frame.

As a result, not only is a bad influence exerted on the vehicle but also the vibration shakes the whole crawler traveling unit.

Means for Solving the Problems

A tractor according to the present invention constructed so that
a transmission casing is arranged in a rear portion of a vehicle body,
a front axle casing is arranged in a front portion of the vehicle body, and
power from an engine is transmitted from an output shaft supported by the transmission casing through a power transmission shaft to an input shaft supported by the front axle casing,
is characterized in that
a gear casing is disposed between the transmission casing and the front axle casing,
the output shaft of the transmission casing and an input shaft of the gear casing are arranged on a same line and connected to each other, and
the input shaft of the front axle casing and an output shaft of the gear casing are arranged on a same line and connected to each other.

The gear casing is detachably attached to the transmission casing.

With regard to the tractor according to the present invention, the gear casing is detachably attached to a clutch housing disposed before the transmission casing.

With regard to the tractor according to the present invention, the gear casing is constructed integrally with a flywheel casing disposed behind the engine.

A differential mechanism of a traveling vehicle disposed in the front portion of the tractor comprises:
a differential connecting left and right output shafts, supported by the front axle casing, through a pair of planetary gear mechanisms;
a turning HST giving difference of rotation speed on the output shafts through the planetary gear mechanisms so as to perform turning; and
a mechanical turning transmission changing power from the turning HST in speed and then transmitting the power to the differential.

With regard to the tractor according to the present invention, the mechanical turning transmission is a hydraulic turning transmission.

With regard to the tractor according to the present invention, the turning transmission is interlockingly connected to a sub transmission disposed in the transmission casing.

The tractor according to the present invention is constructed so that
power from the engine mounted on the traveling vehicle of the tractor is transmitted to a hydraulic clutch type forward/rearward traveling switching device and the main transmission,
subsequently the power is transmitted to the sub transmission and changed in speed, and then traveling drive is performed,
the turning HST is actuated so as to control turning, and
pressure oil is returned from the turning HST through an oil cooler to the transmission casing.

The tractor according to the present invention is constructed so that
power from the engine mounted on the traveling vehicle of the tractor is transmitted to a hydraulic clutch type forward/rearward traveling switching device and the main transmission,
subsequently the power is transmitted to the sub transmission and changed in speed, and then traveling drive is performed,
the turning HST is actuated so as to control turning, and
pressure oil returning from the turning HST is supplied through an oil cooler to frictional boards of the hydraulic clutch of the forward/rearward traveling switching device.

The tractor according to the present invention is constructed so that
a crawler traveling unit is provided in the tractor,
the crawler traveling unit is constructed so that a track roller is provided between a drive sprocket and an idler and a crawler belt is wound around the drive sprocket, the idler and the track roller, a shaft rotatably supporting the track roller is divided into plural parts, and the divided shafts are connected to each other through an elastic member.

Ends of the divided shafts are shaped so as to engage with each other.

The ends of the divided shafts are shaped so as to mesh with each other.

Effect of the Invention

With regard to the tractor according to the present invention, the power transmission shaft, connecting the output shaft of the transmission casing to the input shaft of the gear casing, or connecting the input shaft of the front axle casing to the output shaft of the gear casing, is arranged substantially horizontally so that any universal joint is not required, whereby the power transmission shaft can be attached easily. Furthermore, the weight of the power transmission shaft can be saved, and the intensity thereof can be improved so as to improve the durability.

With regard to the tractor according to the present invention, the transmission casing and the front axle casing are connected and fixed to each other through the gear casing stably. The detachment thereof is easy so as to improve the maintainability.

With regard to the tractor according to the present invention, the power transmission shaft connecting the output shaft of the transmission casing to the input shaft of the gear casing and the power transmission shaft connecting the input shaft of the front axle casing to the output shaft of the gear casing are constructed by two comparatively short shafts, whereby the intensity of the power transmission shaft can be improved so as to improve the durability. Furthermore, the weight of the power transmission shaft can be saved, whereby the attachment work of the power transmission shaft becomes easy. Besides, the gear casing is detachably provided to the clutch housing, whereby the maintenance work and the like can be performed easily.

With regard to the tractor according to the present invention, the power transmission shaft connecting the output shaft of the transmission casing to the input shaft of the gear casing and the power transmission shaft connecting the input shaft of the front axle casing to the output shaft of the gear casing are constructed by two comparative short shafts, whereby the intensity of the power transmission shaft can be improved so as to improve the durability. Furthermore, the weight of the power transmission shaft can be saved, whereby the attachment work of the power transmission shaft becomes easy. Besides, the gear casing and the flywheel casing are constructed integrally with each other, whereby the number of parts is reduced.

With regard to the tractor according to the present invention, power from the turning HST is changed in speed by the mechanical turning transmission and then inputted into the differential so that the difference of rotation speed is caused between left and right output shafts by the planetary gear mechanism. Accordingly, when an operator operates the speed change of the transmission, the speed change is also performed in the turning transmission. Then, when the steering wheel is operated so as to turn laterally, the difference of rotation speed of the output shafts is also changed, whereby the optimum turning radius corresponding to the vehicle speed is obtained. The output from the turning HST may be in substantially the same pattern regardless of whether it is under high speed traveling or low speed traveling. Accordingly, by setting the optimum output pattern, the power can be used maximally so as to reduce the output loss. It is not necessary to interlock the turning HST with the speed change lever, the linkage mechanism interlocking the turning HST with the steering wheel can be constructed simply. Besides, with regard to the vehicle providing the differential in the front axle casing, the front portion of the vehicle becomes heavy, whereby the longitudinal balance of the vehicle body is improved.

With regard to the tractor according to the present invention, even if the steering wheel is operated so as to turn laterally, the power outputted from the turning HST can be adjusted so as to change the turning radius of the vehicle by operating the speed change means so as to perform the speed change of the hydraulic turning transmission. It is not necessary to provide any linkage mechanism comprising rod or the like interlocking the turning transmission with the speed change means, whereby the turning transmission can be interlocked with the speed change means by a simple construction.

With regard to the tractor according to the present invention, in the case of turning the vehicle, the turning feeling corresponding to the speed range is obtained.

With regard to the tractor according to the present invention, the pressure oil returning from the turning HST is supplied through the oil cooler to the transmission casing directly without passing through the reverser control valve or the like, whereby oil pressure loss becomes small and cooling effect is improved. Furthermore, the inside of the transmission casing can be cooled efficiently by the pressure oil cooled by the oil cooler.

With regard to the tractor according to the present invention, the pressure oil returning from the turning HST is supplied through the oil cooler to the frictional boards of the hydraulic clutch, whereby the hydraulic clutch is cooled and the frictional characteristics thereof is stabilized.

With regard to the tractor according to the present invention, impact and vibration put on the track roller are absorbed by the elastic member, whereby the influence caused by the impact and vibration is not transmitted to the crawler traveling unit so as to suppress the vibration of the vehicle body having the crawler traveling unit.

With regard to the tractor according to the present invention, the ends of the shafts are shaped so that they are easy to engage with each other, whereby the shafts can be engaged with each other easily.

With regard to the tractor according to the present invention, since the shafts are engaged with each other by meshing, the shafts can be aligned automatically by the rotation or vibration of the track rollers.

The engagement is formed only by meshing and does not require any bolt and nut so that less parts are required, whereby the cost can be reduced and working processes in manufactural course can be simplified.

DETAILED DESCRIPTION OF THE INVENTION

Figure 1:
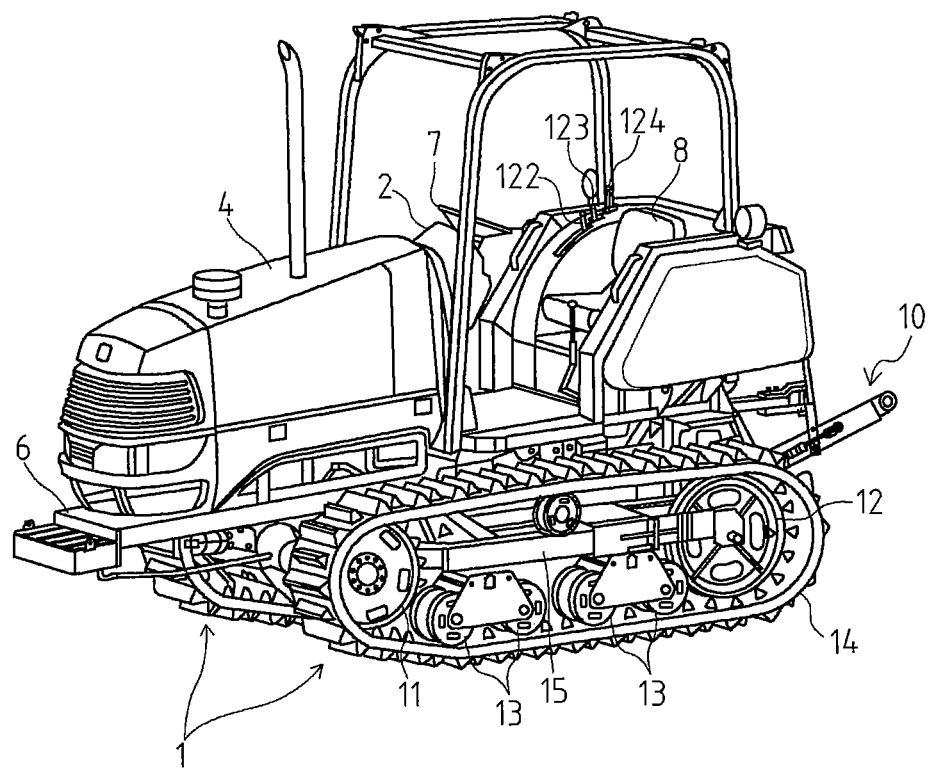
FIG. 1 is a perspective view of the entire construction of a tractor according to an embodiment of the present invention.

Next, explanation will be given on the best mode embodiment of the invention.

Firstly, according to FIGS. 1, 2 and 3, explanation will be given on the schematic construction of a crawler tractor to which a power transmission mechanism according to an embodiment of the present invention.

An engine 3 is arranged above a front portion of a crawler traveling unit 1, and a transmission casing 23 (see FIG. 3) is arranged above the rear portion thereof. The engine 3 is fixed between left and right lower main frames 6 and is covered by a bonnet 4. A dashboard 2 is provided behind the bonnet 4. A turning column is provided in the dashboard 2, and a steering wheel 7 for turning operation is arranged at the upper end of a steering wheel shaft supported by the turning column. A reverser lever 121 for switching forward/rearward traveling of the vehicle is projectingly provided on the side of the dashboard 2. A seat 8 is disposed behind the steering wheel 7, and a main speed change lever 122, a sub speed change lever 123 and a PTO speed change lever 124 are disposed near the seat 8. A step 18 is arranged below the position between the dashboard 2 and the seat 8 so as to construct an operator part. At the rear end of the vehicle, a three-link type mount unit 10 is provided so as to mount each working machine.

With regard to the crawler traveling unit 1, a front axle casing 25 (see FIG. 3) is fixed at a front end of a track frame 15. A drive sprocket 11 is supported by a drive shaft 118 (see FIG. 3) supported by the front axle casing 25. On the other hand, an idler (driven sprocket) 12 is rotatably supported at the rear end of the track frame 15.

Equalizers 20 are provided between the drive sprocket 11 and the idler 12 so as to rock centering on a rocking shaft 29 along the traveling direction (longitudinal direction).

The equalizers 20 support track rollers 13 rotatably.

Each of crawler belts 14 is wound around the drive sprocket 11, the idler 12 and the track rollers 13.

According to this construction, when the crawler traveling unit 1 travels on an uneven field, the equalizers 20 supporting track rollers 13 rock along the traveling direction (longitudinal direction) so as to absorb the effect of the unevenness, whereby large vertical movement of the vehicle is suppressed.

It may be constructed that the idler 12 is moved along the traveling direction (longitudinal direction) so as to adjust the tension of the crawler belt 14. Furthermore, by providing at least one upper track roller 17 on the upper side of the crawler belt 14, the crawler belt 14 can be prevented from hanging down.

Next, explanation will be given on the drive transmission system of the crawler tractor according to FIGS. 3, 4 and 5.

A clutch housing 22 housing a forward/rearward traveling switching device 30 and a main transmission 50 therein is disposed before the engine 3 through a flywheel casing 21. The transmission casing 23 housing a sub transmission 70 and a PTO transmission 40 therein is disposed before the clutch housing 22. The rear surface of the transmission casing 23 is closed by a rear casing 24. Power from the engine 3 is changed in speed by the main transmission 50 and then changed in speed by the sub transmission 70, thereby being transmitted to the drive sprocket 11. Power of the PTO shaft is transmitted from a PTO transmission shaft 42 through the PTO transmission 40.

The front axle casing 25 housing a differential 100 therein is arranged below the engine 3, and is supported at the front end of the track frame 15. A fixed capacity type hydraulic motor 68 is attached to the front surface of the front axle casing 25 so as to construct a turning hydraulic stepless transmission (hereinafter, referred to as turning HST) 69 comprises the hydraulic motor 68 and a variable capacity type hydraulic pump 67 attached to the side surface of the clutch housing 22. The turning HST 69 is constructed as described below. The movable swash plate of the hydraulic pump 67 is interlocked with the steering wheel 7 through a speed change arm so that the discharge amount of the hydraulic pump 67 is adjusted according to the operation amount of the steering wheel 7. According to the discharge amount of the hydraulic pump 67, an output shaft 68a of the hydraulic motor 68 is driven at changed rotation speed and rotation direction. Then, the output of the turning HST 69 and the output of the sub transmission 70 are combined by the differential 100 and transmitted to the drive sprocket 11 through the left and right drive shafts 118. Consequently, the vehicle travels straight when the output of the turning HST 69 is stopped, and is turned when the output of the turning HST 69 is transmitted to the left and right drive shafts 118. Accordingly, by rotatively driving the drive sprocket 11, the crawler belt 14 is rotated so as to drive the crawler traveling unit 1.

Next, explanation will be given on the concrete construction of the power transmission mechanism.

Figure 14:
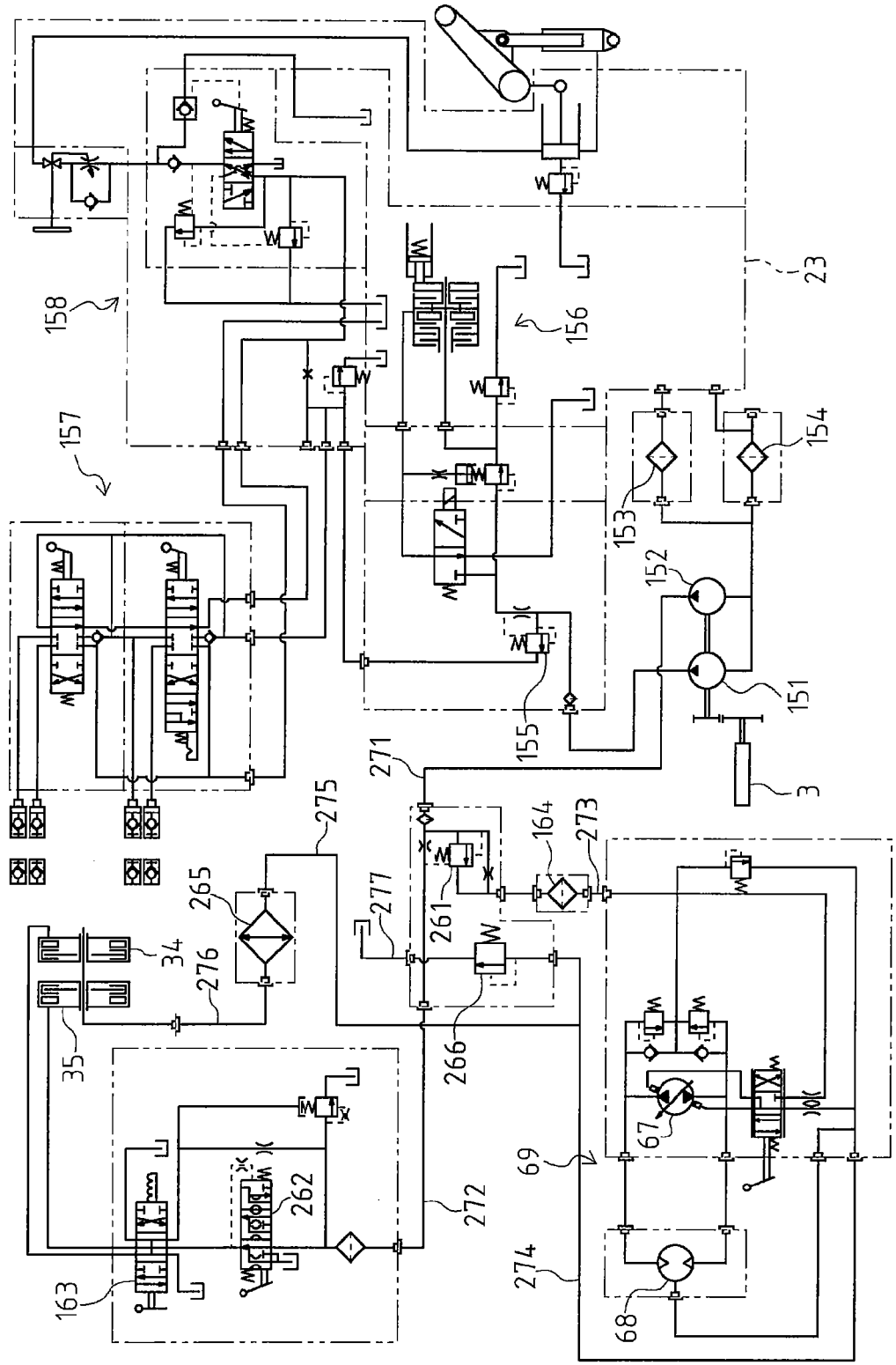
FIG. 14 is a drawing of a hydraulic circuit.
Figure 15:
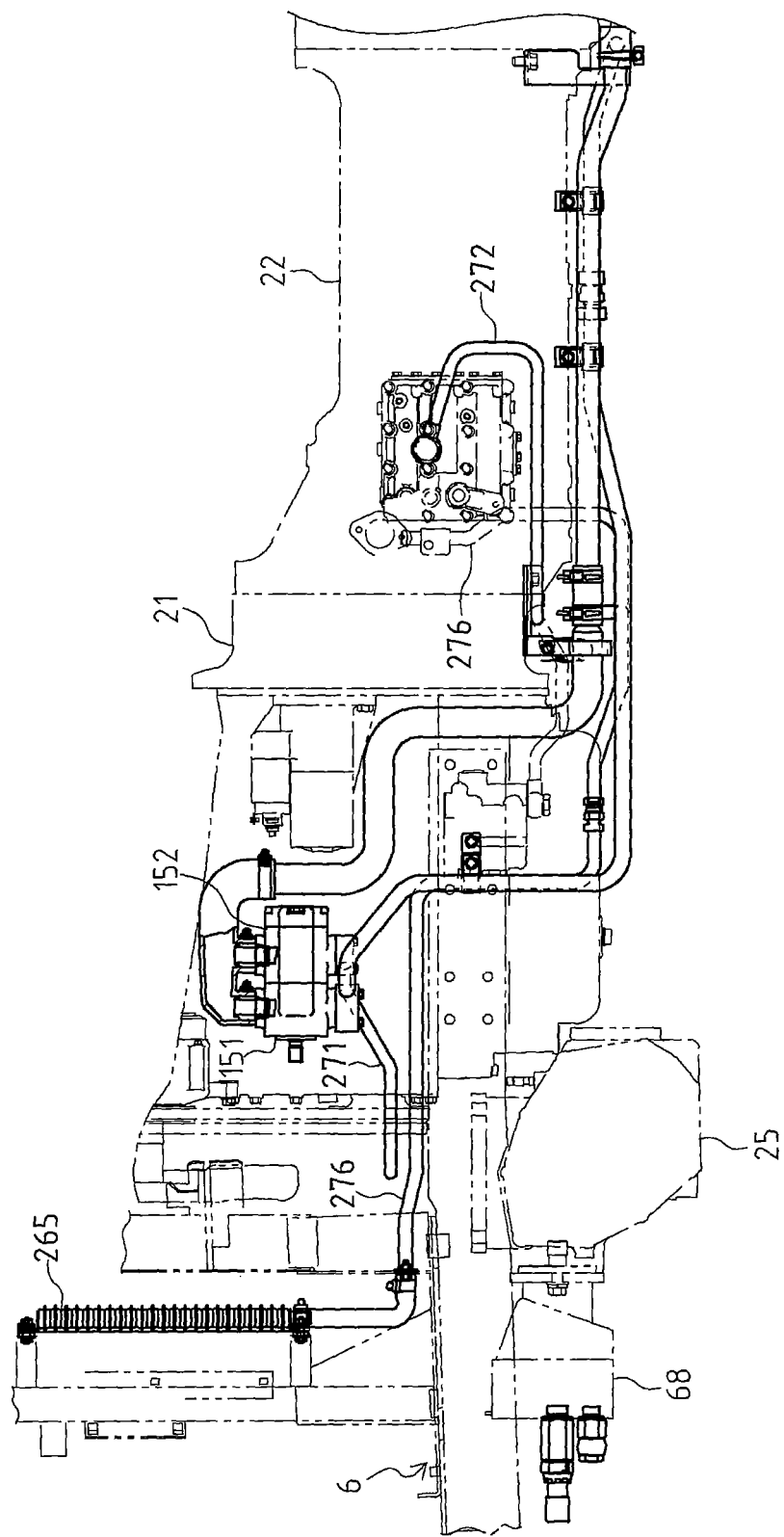
FIG. 15 is a left side view of a hydraulic piping.
Figure 16:
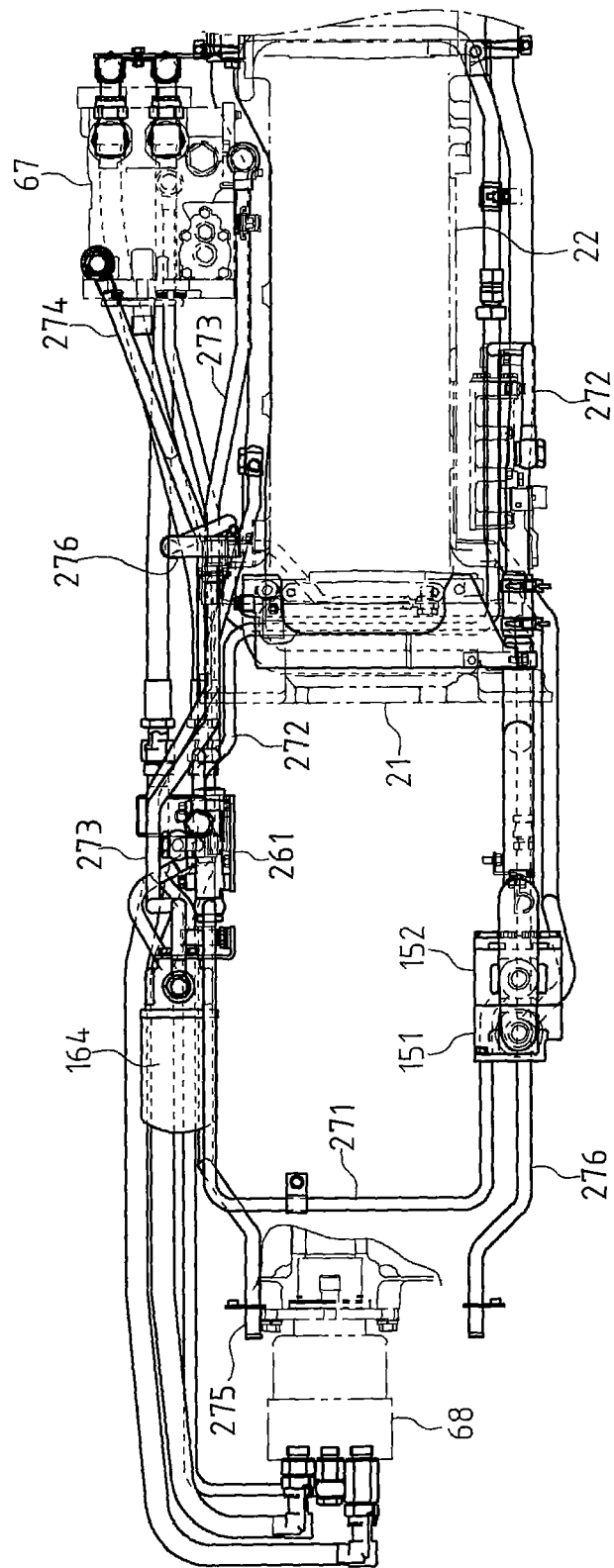
FIG. 16 is a plan view of the hydraulic piping.
Figure 17:
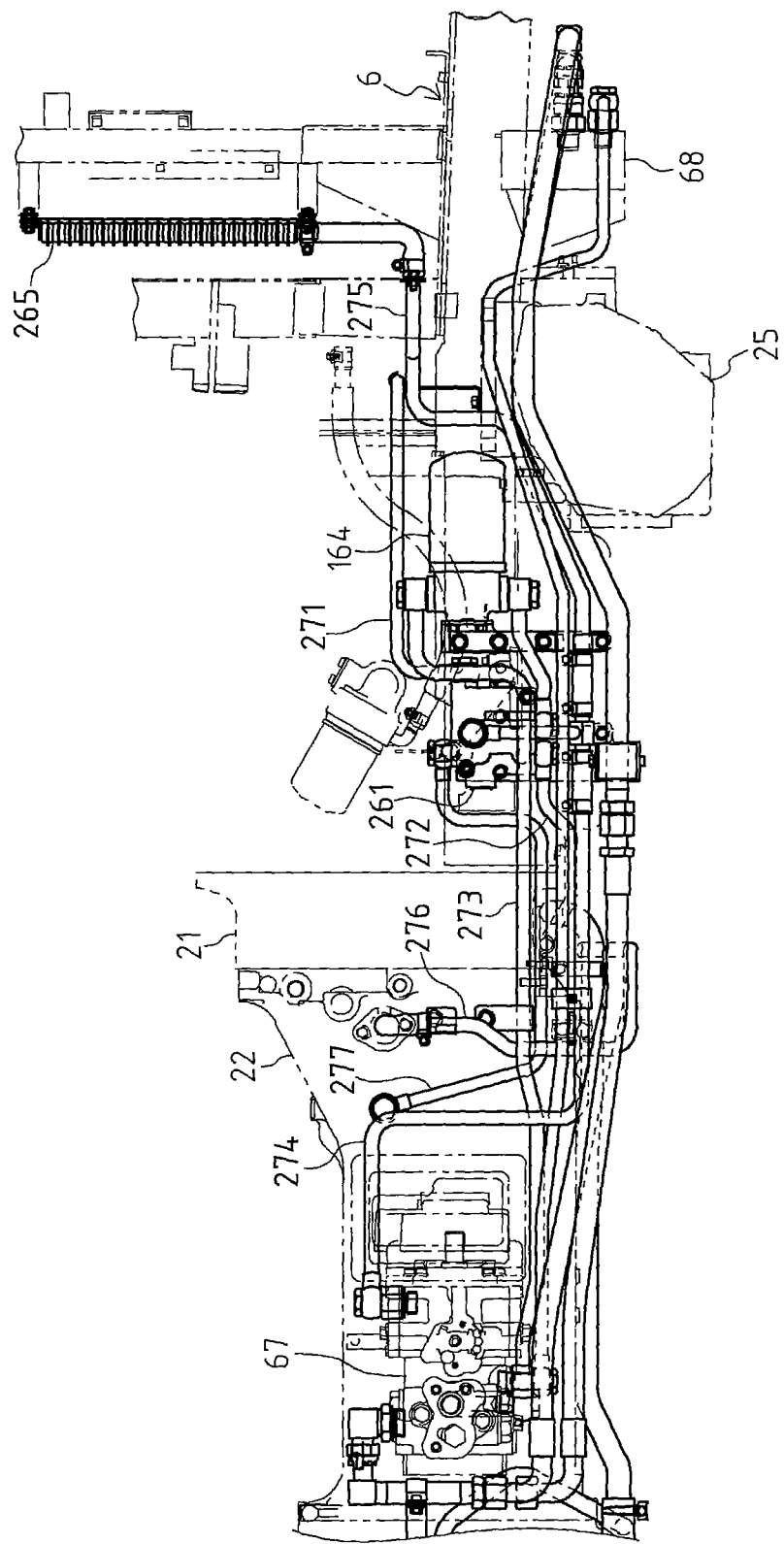
FIG. 17 is a right side view of the hydraulic piping.

An output shaft 3a of the engine 3 is projected rearward and is connected to a main shaft 31, pivotally supported by the clutch housing 22, through a flywheel 27 and a damper 28. A normal rotation gear 32 and a reverse rotation gear 33 are freely fitted on the main shaft 31. A forward traveling hydraulic clutch 34 is disposed between the normal rotation gear 32 and the main shaft 31, and a rearward traveling hydraulic clutch 35 is disposed between the reverse rotation gear 33 and the main shaft 31. The forward traveling hydraulic clutch 34 and the rearward traveling hydraulic clutch 35 are engaged/disengaged by switching a reverser control valve 163 (see FIG. 14) interlocked with the reverser lever 121. By operating the reverser lever 121 so as to switch the reverser control valve 163, either the forward traveling hydraulic clutch 34 or the rearward traveling hydraulic clutch 35 is engaged, whereby power is transmitted from the main shaft 31 to either the normal rotation gear 32 or the reverse rotation gear 33. However, when the reverser lever 121 is at the neutral position, the power from the main shaft 31 is not transmitted to the normal rotation gear 32 and the reverse rotation gear 33.

The normal rotation gear 32 engages with a gear 37 fixed on a transmission shaft 36 disposed in parallel to the main shaft 31, and is connected to a pipe-like main speed change input shaft 55, freely fitted to the outer surface of the main shaft 31 extended rearward, so as not to be rotatable relatively. The reverse rotation gear 33 engages with a counter gear 39 fixed on a counter shaft, and the counter gear 39 engages with a gear 38 fixed on the transmission shaft 36. Accordingly, the forward/rearward traveling switching device 30 is constructed. By engaging the forward traveling hydraulic clutch 34, the power from the main shaft 31 is transmitted through the normal rotation gear 32 to the main speed change input shaft 55 so as to rotate the main speed change shaft forwardly. On the contrary, by engaging the rearward traveling hydraulic clutch 35, the power from the main shaft 31 is transmitted through the reverse rotation gear 33, the counter gear 39 and the gear 38 to the transmission shaft 36. Then, the power is transmitted from the transmission shaft 36 through the gear 37 and the normal rotation gear 32 to the main speed change input shaft 55 so as to rotate the main speed change input shaft 55 reversely.

The main shaft 31 is extended rearward. The PTO transmission shaft 42 supported by the transmission casing 23 is connected coaxially to the rear end of the main shaft 31 through a PTO clutch 41. A PTO input shaft 43 is connected coaxially to the rear end of the PTO transmission shaft 42 so as not to be rotatable relatively, whereby the output of the PTO clutch 41 is transmitted through the PTO transmission shaft 42 to the PTO input shaft 43. A first input gear 44 and a second input gear 45 are fixed on the PTO input shaft 43, and a first output gear 47 and a second output gear 48 freely fitted on a PTO shaft 46 engage respectively with the gears 44 and 45. The PTO shaft 46 is supported by the transmission casing 23 and the rear casing 24, and is projected rearward from the rear casing 24.

At the position between the first output gear 47 and the second output gear 48, the PTO shaft 46 is engaged with a clutch slider 49 through a clutch hub so as not to be rotatable rotate relatively and to be slidable along the axial direction. The clutch slider 49 is interlocked with the PTO speed change lever 124 through a suitable linkage mechanism.

Claws which can be engaged with the clutch slider 49 are formed on the first output gear 47 and the second output gear 48. Accordingly, by operating the PTO speed change lever 124, the clutch slider 49 is slid along the axial direction so as to be engaged with either the first output gear 47 or the second output gear 48. Consequently, the PTO transmission 40 is constructed so that it can perform two-stage speed change. Power of the PTO input shaft 43 is outputted to either the first output gear 47 or the second output gear 48 on the PTO shaft 46. Then, power of the main speed change input shaft 55 after a change in speed is outputted from either the first output gear 47 or the second output gear 48 to the PTO shaft 46.

A first input gear 51, a second input gear 52, a third input gear 53 and a fourth input gear 54 are fixed or formed integrally on the main speed change input shaft 55. The four gears 51, 52, 53 and 54 engage respectively with a first output gear 56, a second output gear 57, a third output gear 58 and a fourth output gear 59 freely fitted on a main speed change shaft 60. Clutch sliders 61 and 62 are engaged with the main speed change shaft 60 so as not to be rotatable relatively and to be slidable along the axial direction respectively at the position between the first output gear 56 and the second output gear 57, and the position between the third output gear 58 and the fourth output gear 59. The clutch sliders 61 and 62 are interlocked with the main speed change lever 122 through a suitable linkage mechanism.

Claws which can be engaged with the clutch sliders 61 and 62 are formed respectively on the first output gear 56, the second output gear 57, the third output gear 58 and the fourth output gear 59. Accordingly, by operating the main speed change lever 122, the sliders 61 and 62 are slid along the axial direction so as to be engaged with either one of the first output gear 56, the second output gear 57, the third output gear 58 and the fourth output gear 59. Consequently, the main transmission 50 is constructed which can perform four-stage speed change. The power of the main speed change input shaft 55 is outputted to either one of the gears 56, 57, 58 and 59 on the main speed change shaft 60. Then, the power of the main speed change input shaft 55 after changed a change in speed is outputted from the output gear to the main speed change shaft 60.

A gear 63 is fixed to the front end of the main speed change shaft 60, and engages with an intermediate gear 65 of an intermediate shaft 64. The intermediate gear 65 engages with a gear 66 fixed to an input shaft 67a of the hydraulic pump 67, whereby power of the main speed change shaft 60 is inputted to the input shaft 67a of the hydraulic pump 67. Accordingly, the hydraulic pump 67 is driven in proportion to the rotation speed after the main speed change.

Figure 25:
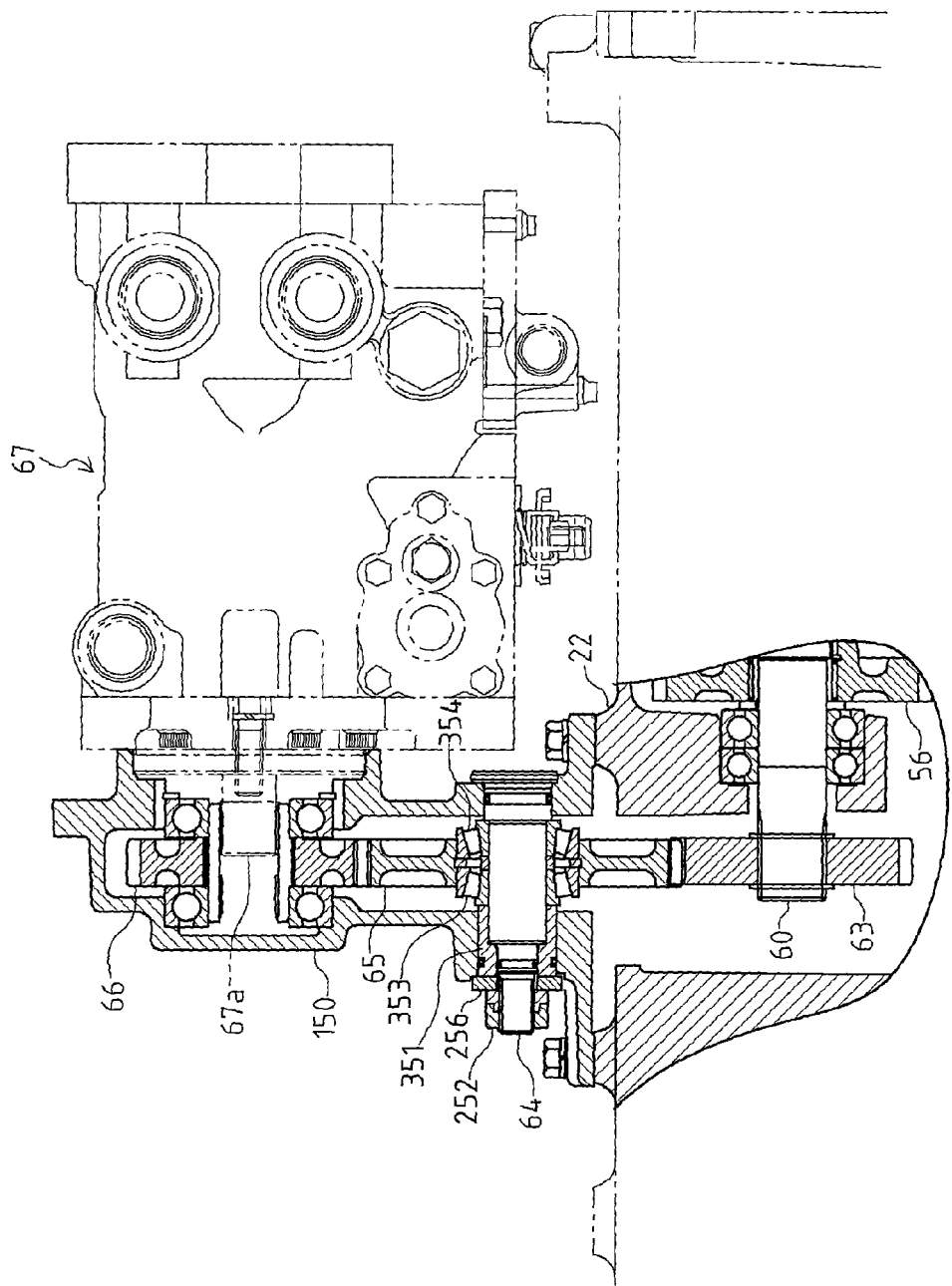
FIG. 25 is a sectional plan view of the gear casing.

As another embodiment discussed later according to FIG. 25, the gear 63 is fixed to the front end of the main speed change shaft 60. The gear 63 engages with the intermediate gear 65 supported by the intermediate shaft 64 in a gear casing 150 discussed later. The intermediate gear 65 engages with the gear 66 fixed to an input shaft 67a of the hydraulic pump 67 of the turning HST 69, whereby the power of the main speed change shaft 60 is inputted to the input shaft 67a of the hydraulic pump 67. Accordingly, as the above mentioned, it may alternatively be constructed that the hydraulic pump 67 is driven in proportion to the rotation speed after the main speed change.

On the other hand, a sub speed change input shaft 74 supported by the transmission casing 23 is connected to the rear end of the main speed change shaft 60 coaxially so as not to be rotatable relatively. A first input gear 71, a second input gear 72 and a third input gear 73 are fixed or formed integrally on the sub speed change input shaft 74. The three gears 71, 72 and 73 engage respectively with a first output gear 76, a second output gear 77 and a third output gear 78 freely fitted on a sub speed change shaft 75 disposed in parallel to the sub speed change input shaft 74. The sub speed change shaft 75 is engaged with clutch sliders 79 and 80 through a clutch hub relatively at the position between the first output gear 76 and the second output gear 77 and the position between the second output gear 77 and the third output gear 78 so as not to be rotatable relatively and to be slidable along the axial direction. The clutch sliders 79 and 80 are interlocked with the sub speed change lever 123 through a suitable linkage mechanism.

Claws which can be engaged with the clutch sliders 79 and 80 are formed on the first output gear 76, the second output gear 77 and the third output gear 78. Accordingly, by operating the sub speed change lever 123, the sliders 79 and 80 are slid along the axial direction so as to be engaged with either one of the first output gear 76, the second output gear 77 and the third output gear 78. Consequently, the sub transmission 70 is constructed which can perform three-stage speed change. Power of the sub speed change input shaft 74 is outputted to either one of the gears 76, 77 and 78 on the sub speed change shaft 75. Then, the power of the sub speed change input shaft 74 after a change in speed is outputted from the output gear to the sub speed change shaft 75.

A bevel gear 81 is fixed to the rear end of the sub speed change shaft 75, and engages with a bevel gear 83 fixed to an output shaft 82. A braking device 84 is disposed on the output shaft 82.

On the other hand, a gear 85 is fixed to the front end of the sub speed change shaft 75, and engages with a gear 87 fixed to an output shaft 86. The output shaft 86 is projected forward from a power take-off 23*a* formed below the transmission casing 23, and is connected to an input shaft 91, supported by a gear casing 90 arranged before the transmission casing 23, coaxially so as not to be rotatable relatively. In the gear casing 90, an input gear 92 formed on the input shaft 91 engages with a gear 94 on a counter shaft 93. The gear 94 engages with an output gear 96 formed on an output shaft 95. The output shaft 95 is projected forward from the lower portion of a front surface of the gear casing 90 and is connected to a power transmission shaft 97 coaxially so as not to be rotatable relatively. The other end of the power transmission shaft 97 is connected to an input shaft 101, projected rearward from the front axle casing 25, coaxially so as not to be rotatable relatively.

Accordingly, with regard to the present invention, the gear casing 90 is arranged vertically between the output shaft 86 projected forward from the transmission casing 23 and the input shaft 101 projected rearward from the front axle casing 25. The input shaft 91 and the output shaft 95 are supported laterally by the gear casing 90 and are arranged in parallel to each other vertically. The input shaft 91 is arranged coaxially to the output shaft 86, and the output shaft 95 is arranged coaxially to the input shaft 101. A power transmission means such as a gear is interposed between the input shaft 91 and the output shaft 95 so as to transmit power. Namely, the power transmission means is arranged between the input shaft 91 and the output shaft 95, which are arranged to be different in their vertical or lateral positions with each other, rectangularly to the input shaft 91 and the output shaft 95. The power transmission means may be constructed by chains and sprockets.

Accordingly, the output shaft 86 of the transmission casing 23 and the input shaft 91 of the gear casing 90 are arranged on one straight line and their ends are connected to each other through a connection member such as a boss. The input shaft 101 of the front axle casing 25 and the output shaft 95 of the gear casing 90 are arranged on one straight line and their ends are connected to each other through a connection member such as a boss.

With regard to the conventional construction, the height of the output shaft of the transmission casing is different from that of the input shaft of the front axle casing, whereby the power transmission shaft, slanted for a fixed angle, is connected to the output shaft and the input shaft through universal joints. However, according to the present invention, the power transmission shaft 97 is arranged substantially horizontally so that any universal joint is not required, whereby the power transmission shaft 97 can be attached easily. Furthermore, the weight of the power transmission shaft 97 can be saved, and the intensity thereof can be improved so as to improve the durability.

Figure 4:
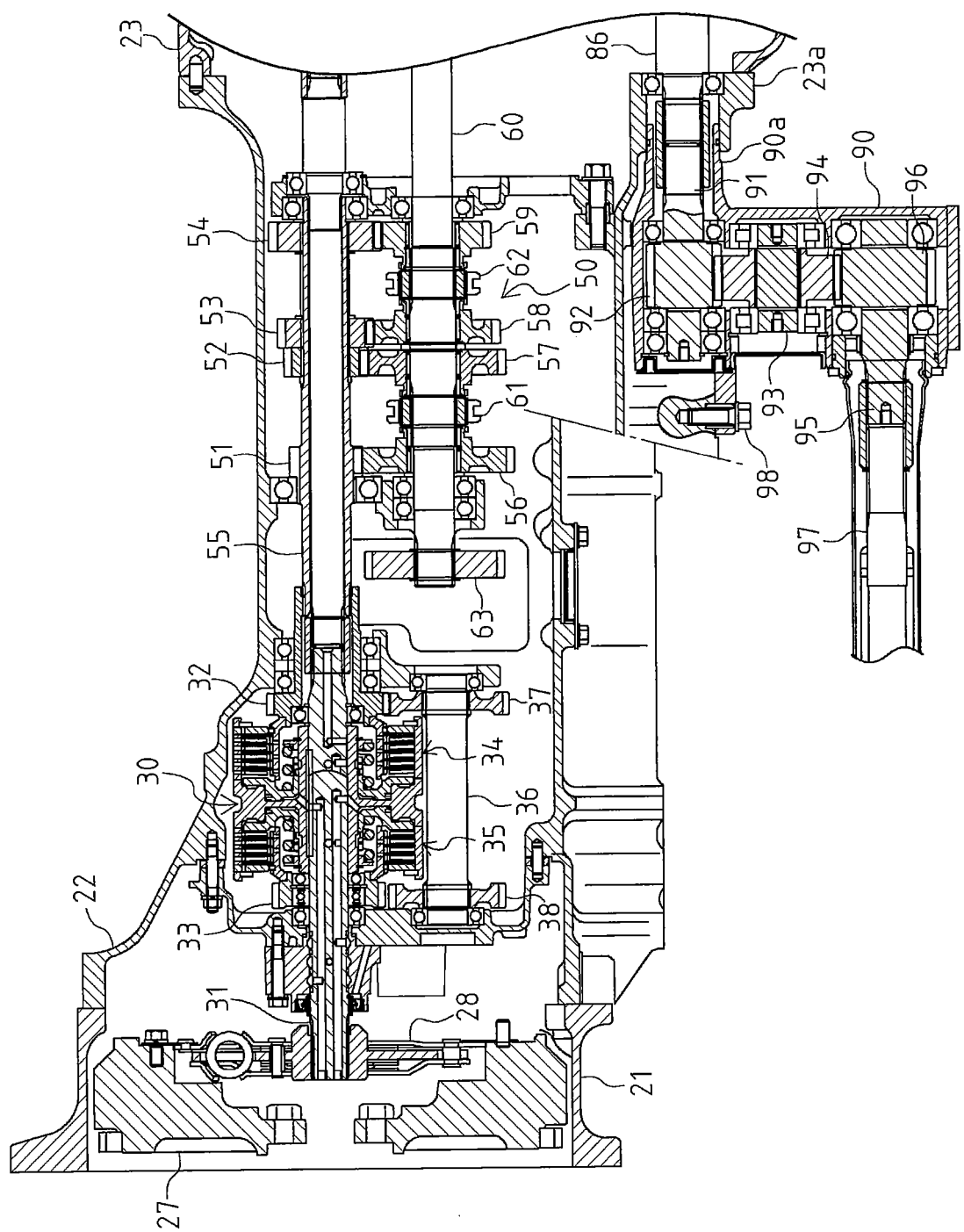
FIG. 4 is a sectional side view of a crutch housing.
Figure 5:
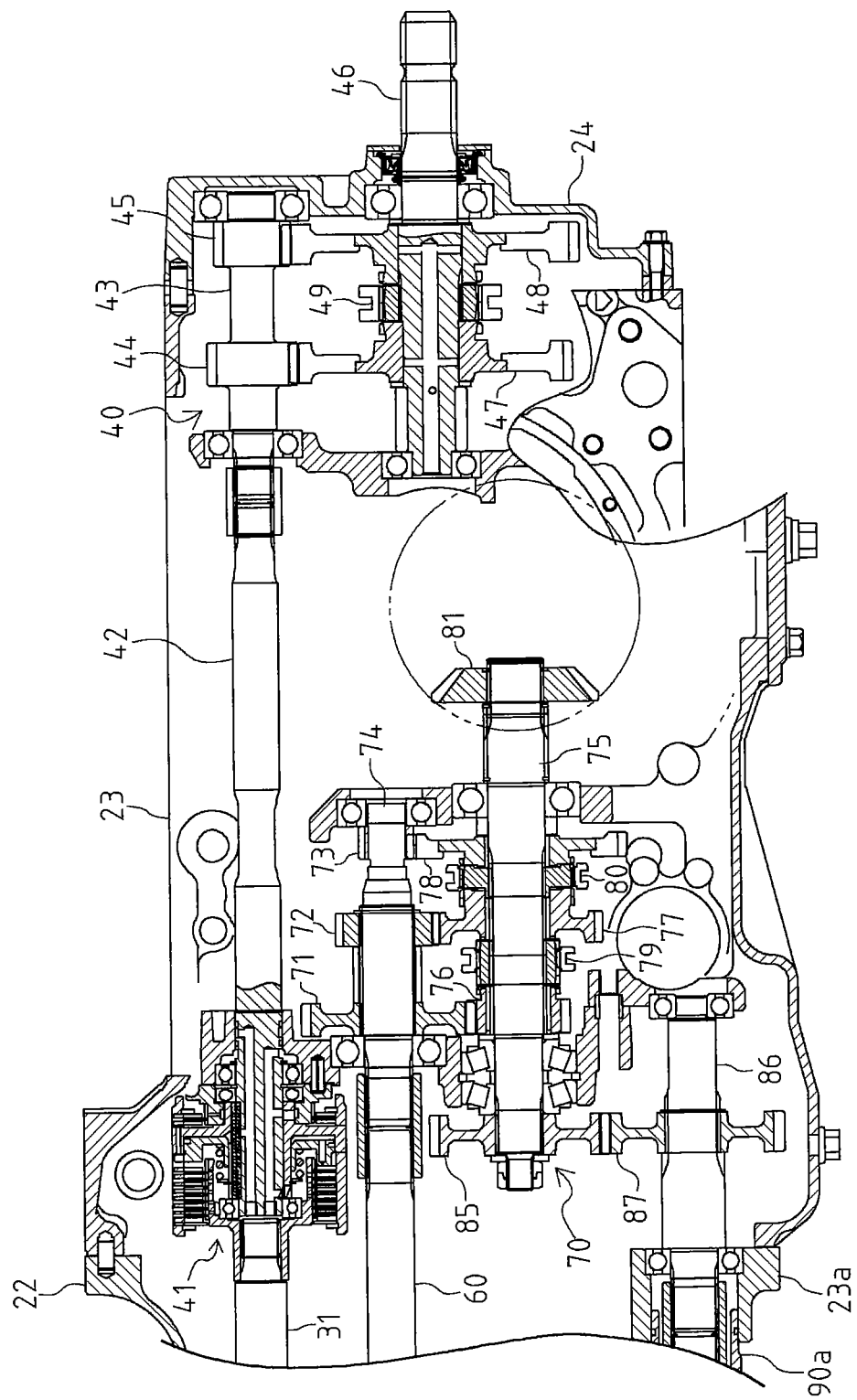
FIG. 5 is a sectional side view of a transmission casing.

As shown in FIG. 4, an engagement part 90*a* which is cylindrical and projected rearward is formed at the upper portion of rear surface of the gear casing 90 through which the input shaft 91 passes. The engagement part 90*a* can be engaged with and fixed to the transmission casing 23 by being inserted into the power take-off 23*a* formed on the lower portion of front surface of the transmission casing 23. Namely, an engagement hole is opened longitudinally on the power take-off 23*a* of the transmission casing 23, and the output shaft 86 is inserted into the engagement hole and the engagement part 90*a* is inserted into and engaged with the engagement hole. In addition, the connection part between the output shaft 86 and the input shaft 91 is disposed in the engagement part 90*a*. It may alternatively be constructed that the engagement part is provided on the transmission casing and the engagement hole is provided on the gear casing.

Figure 6:
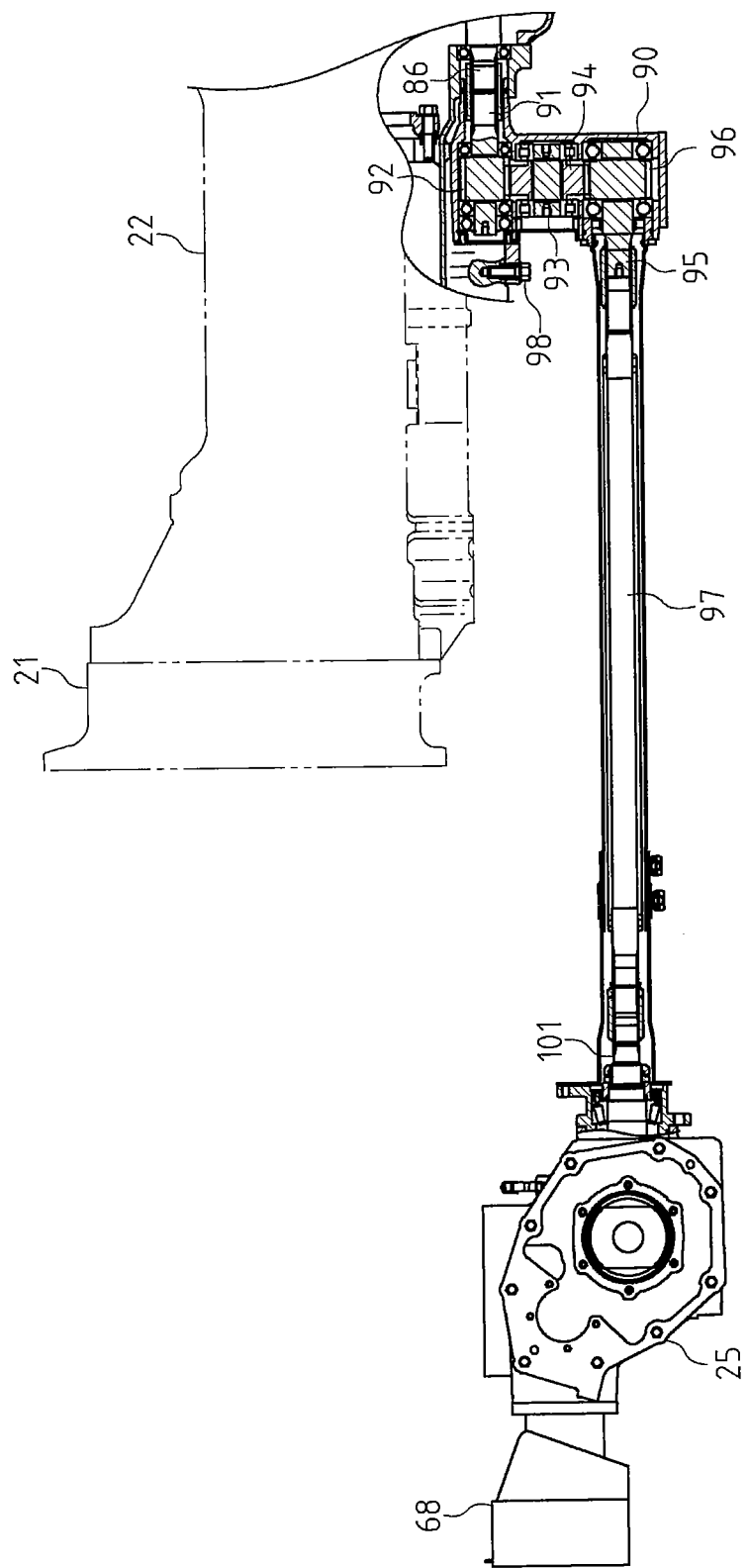
FIG. 6 is a drawing of an embodiment of the arrangement of a gear casing.

With regard to the first embodiment, as shown in FIG. 6, the engagement part 90*a* is engaged with the power take-off 23*a*, and then the gear casing 90 is fixed to the lower end of the clutch housing 22 by fastening members 98 such as bolts. Accordingly, the gear casing 90 is detachably attached to the transmission casing 23 and the clutch housing 22, thereby improving maintainability. The gear casing 90 is fixed to extend over the transmission casing 23 and the clutch housing 22, whereby the transmission casing 23 and the clutch housing 22 are fixed steady.

Figure 7:
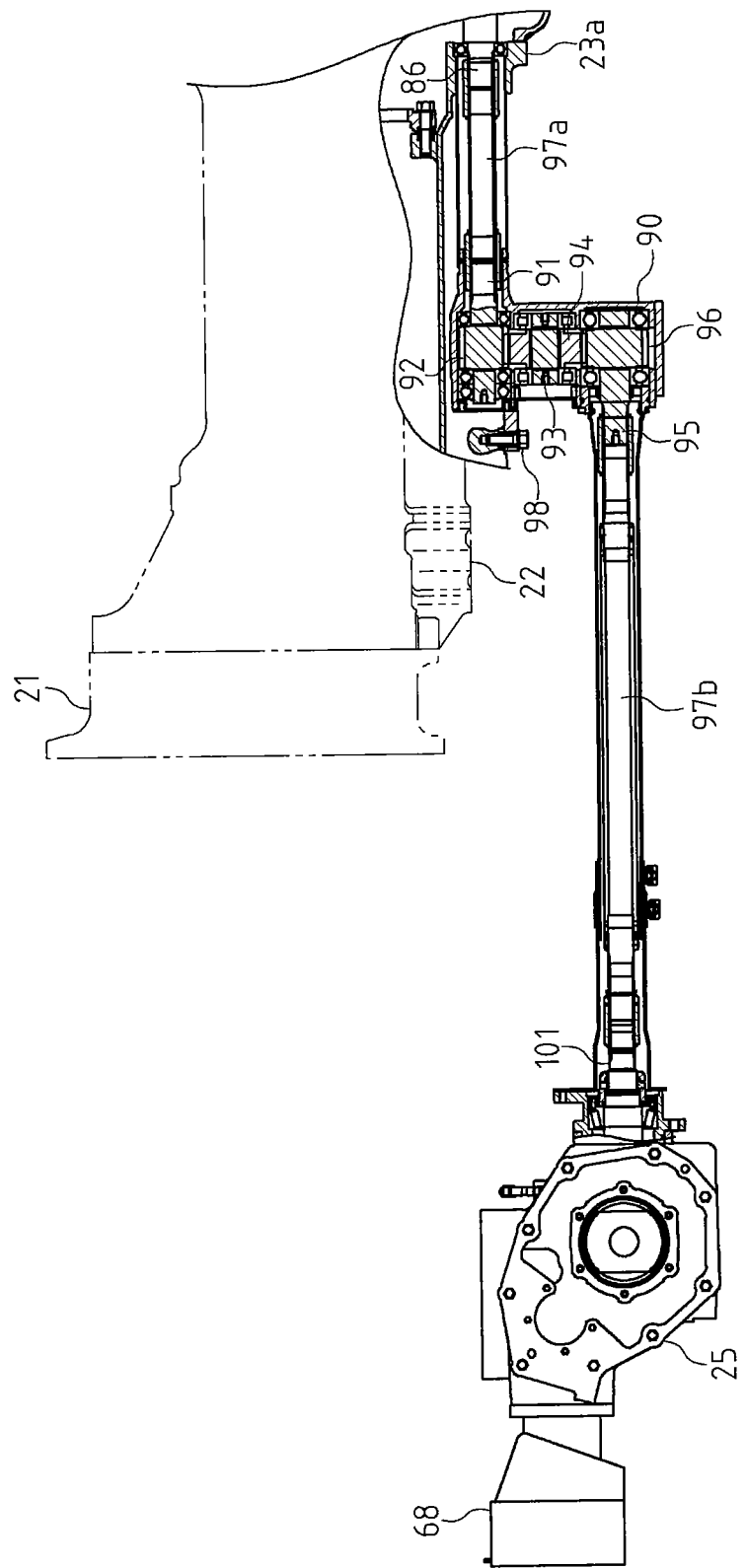
FIG. 7 is a drawing of an embodiment of the arrangement of the gear casing.

As the second embodiment shown in FIG. 7, the gear casing 90 may be arranged at the longitudinal middle portion of the front lower portion of the clutch housing 22 while the output shaft 86 and the input shaft 91 are arranged on one straight line and the input shaft 101 and the output shaft 95 are arranged on one straight line. That is, the gear casing 90 is fixed to the lower or side portion of the clutch housing 22 by the fastening members 98 such as bolts so as to be attached detachably. In this case, the output shaft 86 of the transmission casing 23 and the input shaft 91 of the gear casing 90 are connected to each other through a first power transmission shaft 97*a* arranged horizontally, and the input shaft 101 of the front axle casing 25 and the output shaft 95 of the gear casing 90 are connected to each other through a second power transmission shaft 97*b* arranged horizontally. Namely, the power transmission shaft 97 is constructed by comparatively short first power transmission shaft 97*a* and second power transmission shaft 97*b*, whereby the intensity of the power transmission shafts 97*a* and 97*b* can be improved so as to improve durability. Furthermore, the weight of the power transmission shafts 97*a* and 97*b* can be saved, whereby the power transmission shafts 97*a* and 97*b* can be attached easily.

Figure 8:
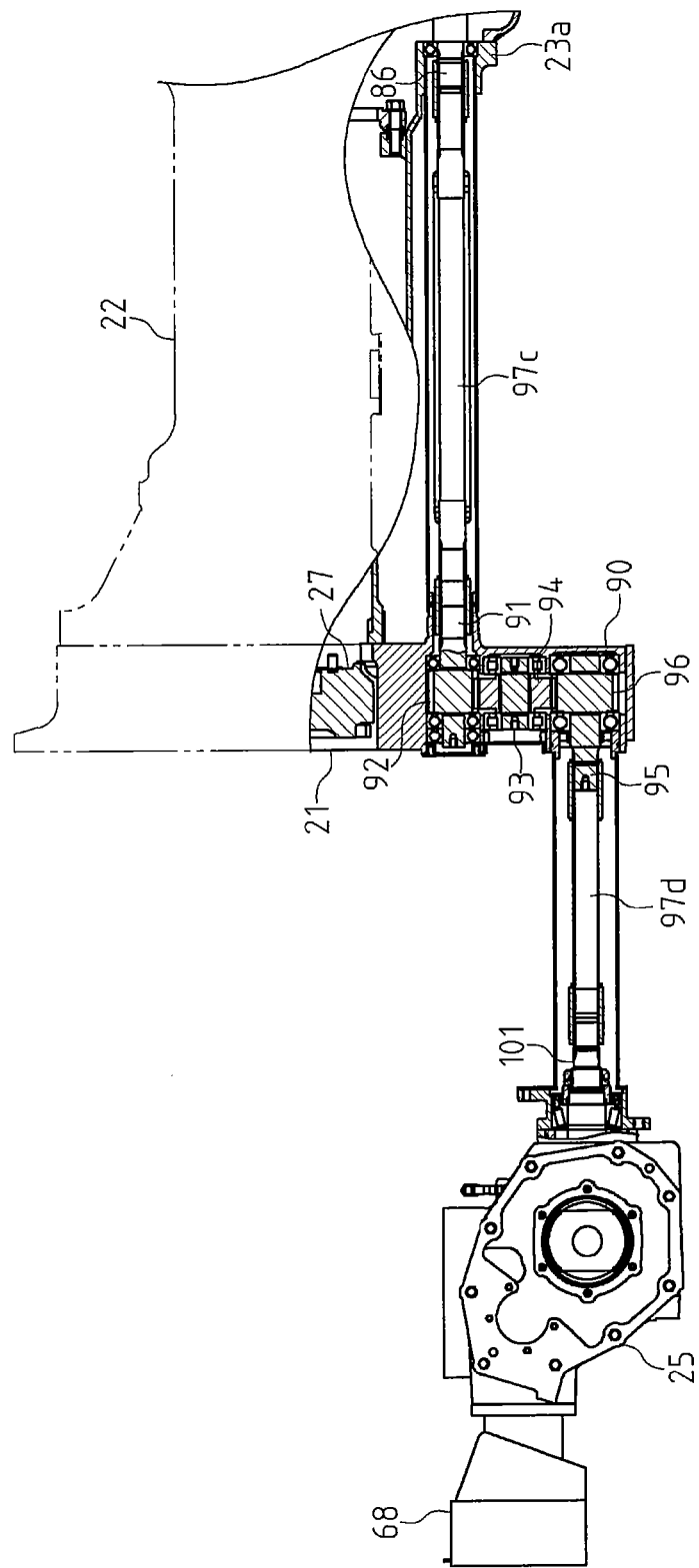
FIG. 8 is a drawing of an embodiment of the arrangement of the gear casing.

As the third embodiment shown in FIG. 8, the gear casing 90 may be arranged below the flywheel casing 21 while the output shaft 86 and the input shaft 91 are arranged on one straight line and the input shaft 101 and the output shaft 95 are arranged on one straight line. That is, the gear casing 90 may be formed in the lower portion of the flywheel casing 21 integrally. Accordingly, the same effect as the second embodiment can be obtained. Furthermore, the number of parts can be reduced. In addition, the gear casing 90 may be fixed to the lower portion of the flywheel casing 21 by bolts or the like.

Figure 3:
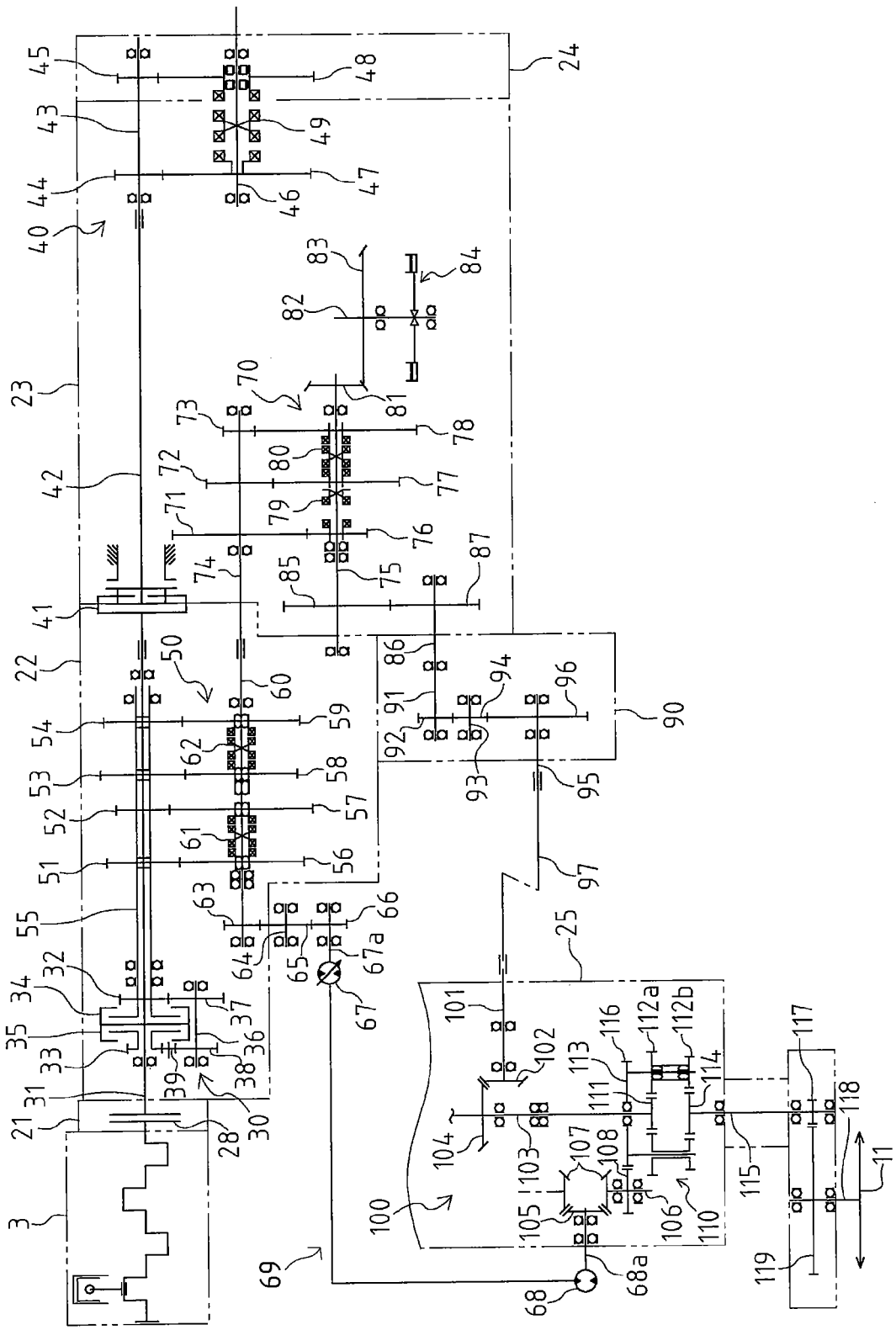
FIG. 3 is a skeleton diagram of the drive transmission route.

The input shaft 101, connected to the output shaft 86 of the transmission casing 23 through the power transmission shaft 97 as the above, is fixed with the other end thereof to a bevel gear 102 in the front axle casing 25 as shown in FIG. 3. The bevel gear 102 engages with a bevel gear 104 fixed to a sun gear shaft 103 of the differential 100 having a pair of left and right planetary gear mechanisms 110. In addition, since the differential 100 is constructed laterally symmetrically, the right side in the traveling direction is omitted in FIG. 3.

The turning HST 69 of the hydraulic motor 68 is attached to the front surface of the front axle casing 25, and the output shaft 68a of the hydraulic motor 68 is extended rearward and projected into the front axle casing 25. A bevel gear 105 is fixed to the rear end of the output shaft 68a, and engages with bevel gears 107 fixed to left and right turning reversing shafts 106, whereby power of reverse rotation is transmitted leftward and rightward. A gear 108 is fixed to the other end of each of the turning reversing shafts 106 so that the rotation of the bevel gears 107 is outputted through the gears 108 to the left and right planetary gear mechanisms 110.

The planetary gear mechanism 110 comprises a sun gear 111, a planetary gear 112, a carrier 113 and an output gear 114. The sun gear 111 is fixed to the sun gear shaft 103, and engages with a gear 112a of two gears 112a and 112b of the planetary gear 112. The other gear 112b engages with the output gear 114 fixed to an output shaft 115. The carrier 113 is freely fitted on the sun gear shaft 103 (the output shaft 115) so as to rotate on the outer perimeter of the sun gear shaft 103. The planetary gear 112 is rotatably supported on a shaft projected from the carrier 113. Furthermore, a gear 116 is formed on the carrier 113 and engages with the gear 108 fixed to the turning reversing shaft 106 to which the bevel gear 107 is fixed.

An input gear 117 is fixed to the other end of the output shaft 115 of the planetary gear mechanism 110 and engages with an output gear 119 fixed to one of ends of the drive shaft 118. The drive sprocket 11 is fixed to the front end of the drive shaft 118 projected laterally from the front axle casing 25.

According to this construction, power from the engine 3 is changed in speed by the main transmission of the clutch housing, and then inputted to the differential 100 of the front axle casing 25 through the sub transmission 70 and the turning HST 69 of the transmission casing 23. Then, in the planetary gear mechanism 110 of the differential 100, when the operation of the steering wheel 7 is kept in the neutral position, the output shaft 68a of the hydraulic motor 68 of the turning HST 69 is not driven rotatively, whereby the bevel gear 105 fixed to the output shaft 68a is fixed so as not to be rotatable. Accordingly, the bevel gears 107 and the gears 108 fixed to the turning reversing shafts 106 are also fixed so as not to be rotatable so that the braking effect occurs on the left and right carriers 113 to which gears 116 engaging with the gears 108 are fixed, whereby the carrier 113 is fixed substantially on the sun gear shaft 103 so as not to be rotatable. Consequently, only the rotation of the sun gear 111 is outputted to the output shaft 115 through the planetary gear 112 rotatably supported by the carrier 113 and the output gear 114. Namely, when the operation of the steering wheel 7 is kept in the neutral position, the output from the engine 3 is inputted to the planetary gear mechanism 110 only through the sub transmission 70 so that the left and right output shafts 115 (the drive sprockets 11) are driven rotatively at the same direction and the same rotation speed, whereby the vehicle travels straight.

On the other hand, when the steering wheel 7 is operated to turn laterally, the discharge amount of the hydraulic pump 67 of the turning HST 69 is adjusted corresponding to the operation amount of the steering wheel 7, and then the output shaft 68a of the hydraulic motor 68 is driven rotatively. Power of the output shaft 68a is outputted through the bevel gear 105 to the bevel gears 107 fixed to the left and right turning reversing shafts 106, whereby the left and right turning reversing shafts 106 are driven rotatively under the opposite direction and the same rotation speed. Accordingly, the left and right carriers 113 engaging with the gears 108 on the turning reversing shafts 106 are rotated on the outer perimeter of the sun gear shaft 103 under the opposite direction and the same rotation speed, whereby the planetary gears 112 are also rotated on the outer perimeter of the sun gear shaft 103 integrally with the carriers 113 under the opposite direction and the same rotation speed. In this case, when the rotation direction of the planetary gears 112 against the carriers 113 is opposite to the rotation direction of the rotation direction of the planetary gears 112 against the sun gear shaft 103, the rotation speeds of the output gears 114 are added up, and if the rotation directions are the same, the rotation speeds of the output gears 114 are subtracted. Then, the rotation of the output gears 114 is outputted to the output shafts 115. Namely, when the steering wheel 7 is operated to turn laterally, the output from the engine 3 changed in speed by the main transmission 50 and passing through the sub transmission 70 and the output passing through the turning HST are combined by the planetary gear mechanism 110, whereby the left and right output shafts 115 (the drive sprockets 11) are driven rotatively while having a difference in speed so that the vehicle turns leftward or rightward.

Next, explanation will be given on the case providing a turning transmission.

Figure 9:
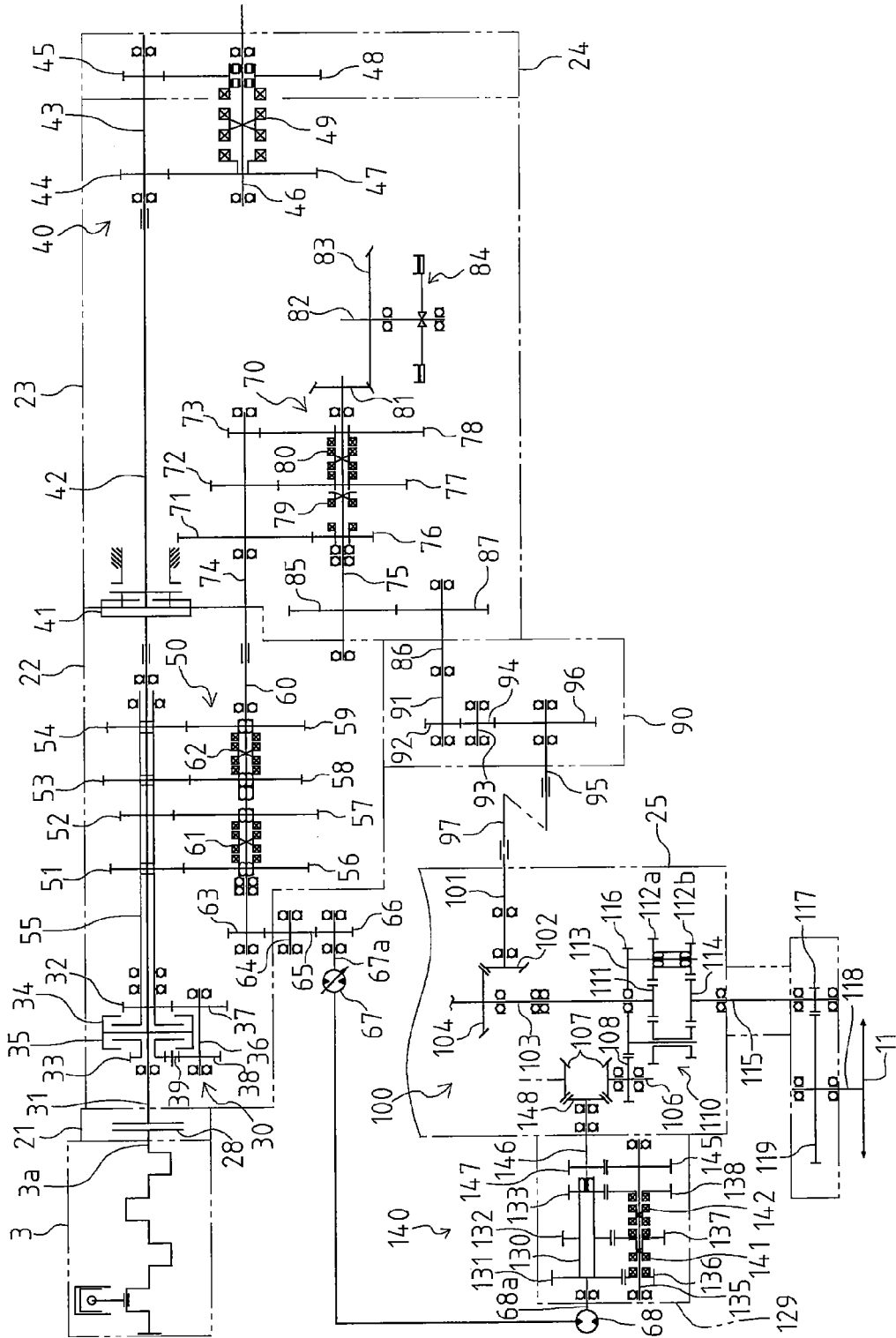
FIG. 9 is a skeleton diagram of the drive transmission route of another embodiment.
Figure 10:
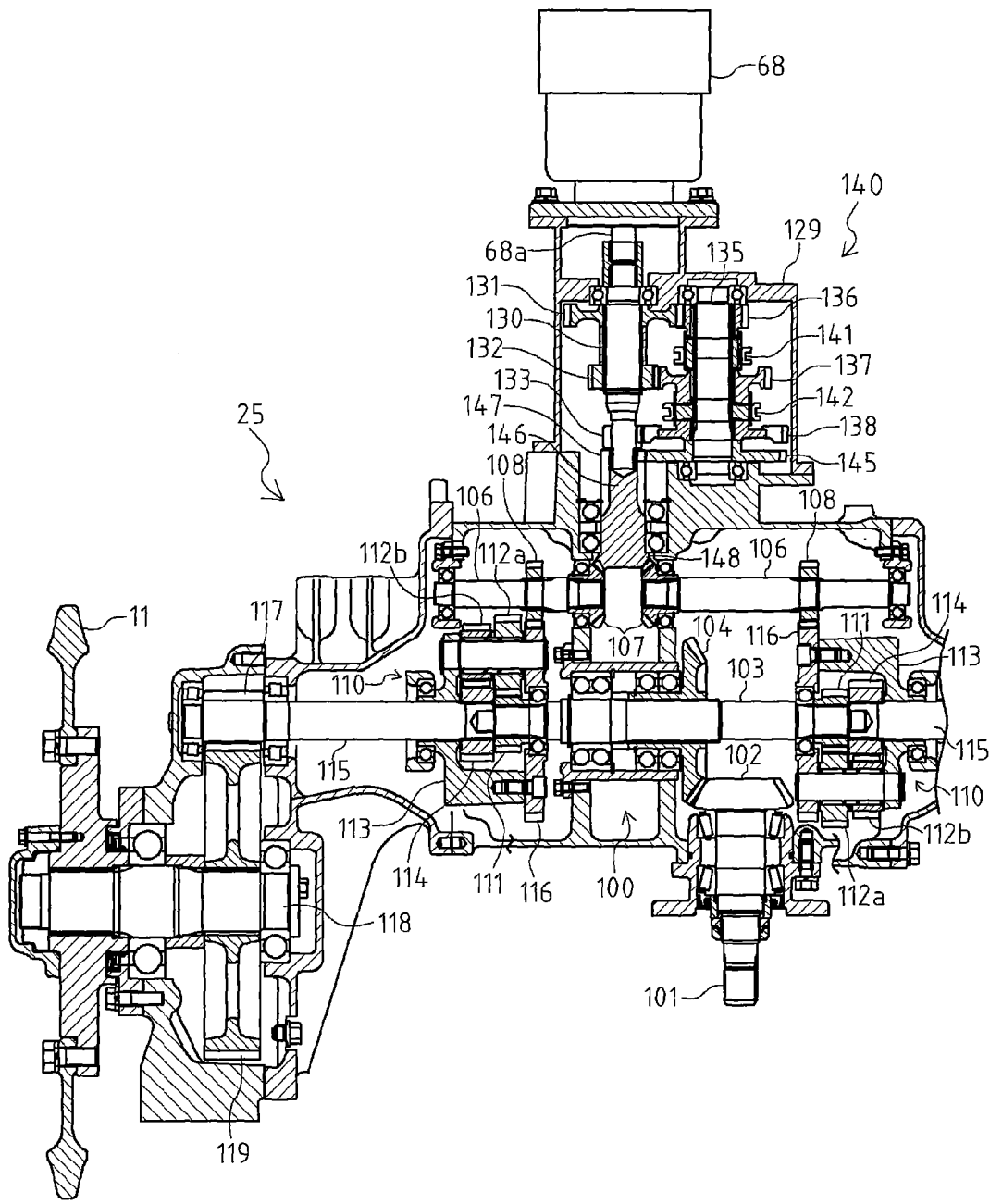
FIG. 10 is a sectional plan view of a front axle casing.

As shown in FIGS. 9 and 10, the hydraulic motor 68 of the turning HST is disposed before the front axle casing 25. A gear casing 129 having a mechanical turning transmission 140 is arranged between the hydraulic motor 68 and the front axle casing 25. The gear casing 129 and the hydraulic motor 68 are fixed to each other by bolts or the like, and the output shaft 68a of the hydraulic motor 68 is extended rearward and projected into the gear casing 129. In the gear casing 129, an input shaft 130 supported by the gear casing 129 is connected coaxially to the rear end of the output shaft 68a. A first input gear 131, a second input gear 132 and a third input gear 133 are fixed or formed integrally on the input shaft 130. An output shaft 135 is supported by the gear casing 129 parallel to the input shaft 130. A first output gear 136, a second output gear 137 and a third output gear 138 are freely fitted on the output shaft 135. The first input gear 131, the second input gear 132 and the third input gear 133 engage respectively with the first output gear 136, the second output gear 137 and the third output gear 138.

Figure 11:
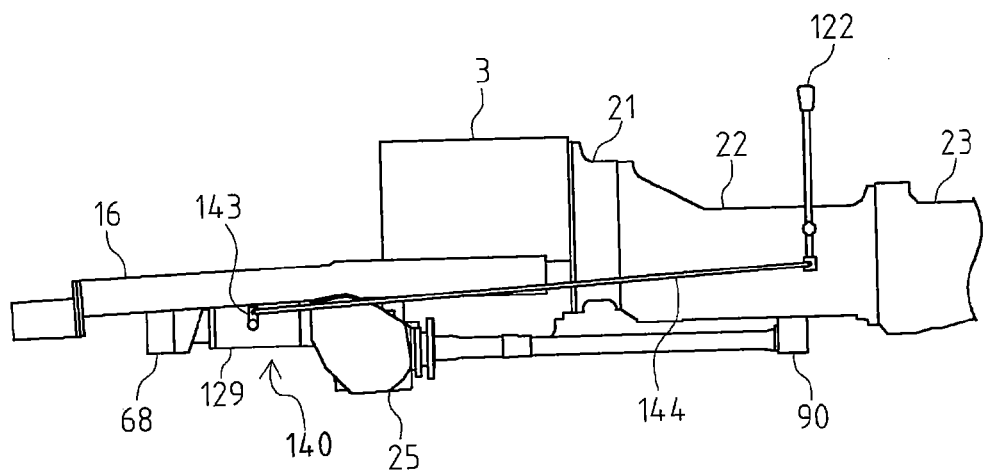
FIG. 11 is a drawing of a linkage mechanism interlocking a mechanical transmission for turning with a main speed change lever.

The output shaft 135 is engaged with clutch sliders 141 and 142 through a clutch hub relatively at the position between the first output gear 136 and the second output gear 137 and the position between the second output gear 137 and the third output gear 138 so as not to be rotatable relatively and to be slidable along the axial direction. The clutch sliders 141 and 142 are engaged with a shifter, and as shown in FIG. 11, the shifter is interlocked with the main speed change lever 122 through a linkage mechanism having a speed change arm 143 and a rod 144 or a wire.

Claws which can be engaged with the clutch sliders 141 and 142 are formed on the first output gear 136, the second output gear 137 and the third output gear 138. Accordingly, by operating the main speed change lever 122, the sliders 141 and 142 are slid along the axial direction so as to be engaged with one of the first output gear 136, the second output gear 137 and the third output gear 138. Consequently, the turning transmission 140 is constructed which can perform three-stage speed change. Power of the input shaft 130 is outputted to one of the gears 136, 137 and 138 on the output shaft 135. Then, the power of the input shaft 130 after a change in speed is outputted from the output gear to the output shaft 135. Accordingly, the gear-sliding type speed change mechanism is constructed.

A gear 145 is fixed to the rear end of the output shaft 135, and engages with a gear 147 formed at a front end of a shaft 146. The shaft 146 is supported in the front portion of the front axle casing 25 coaxially to the input shaft 130, and the rear end of the shaft 146 is projected into the front axle casing 25. A bevel gear 148 formed at the rear end of the shaft 146 engages with the bevel gears 107 fixed to the left and right turning reversing shafts 106, whereby the left and right turning reversing shafts 106 are driven rotatively toward the opposite direction. The gear 108 is fixed at the other end of each of the turning reversing shafts 106 so that the rotation of the bevel gears 107 is transmitted to the left and right planetary gear mechanisms 110 through the gears 108.

In this case, similarly to the above-mentioned case, power from the engine 3 is changed in speed by the main transmission of the clutch housing, and then inputted to the differential 100 of the front axle casing 25 through the sub transmission 70 of the transmission casing 23 and the turning HST 69 and the turning transmission 140. In the planetary gear mechanism 110 of the differential 100, when the operation of the steering wheel 7 is kept in the neutral position, the output shaft 68a of the hydraulic motor 68 of the turning HST is not driven rotatively, whereby the bevel gear 105 fixed to the output shaft 68a is fixed so as not to be rotatable. Accordingly, the bevel gears 107 and the gears 108 fixed to the turning reversing shafts 106 are also fixed so as not to be rotatable. Therefore, the braking effect occurs on the left and right carriers 113 to which gears 116 engaging with the gears 108 are fixed, whereby the carrier 113 is fixed substantially on the sun gear shaft 103 so as not to be rotatable. Consequently, only the rotation of the sun gear 111 is outputted to the output shaft 115 through the planetary gear 112 rotatably supported by the carrier 113 and the output gear 114. Namely, when the operation of the steering wheel 7 is kept in the neutral position, the output from the engine 3 is inputted to the planetary gear mechanism 110 only through the sub transmission 70 so that the left and right output shafts 115 (the drive sprockets 11) are driven rotatively at the same direction and the same rotation speed, whereby the vehicle travels straight.

On the other hand, when the steering wheel 7 is operated to turn laterally, similarly to the above-mentioned case, pressure oil is discharged from the hydraulic pump 67 to the hydraulic motor 68 of the turning HST 69 by the operation of the steering wheel 7, and then the output shaft 68a of the hydraulic motor 68 is driven rotatively. The power of the output shaft 68a is changed in speed by the turning transmission 140, and then outputted through the bevel gear 148 to the bevel gears 107 fixed to the left and right turning reversing shafts 106, whereby the left and right turning reversing shafts 106 are driven rotatively under the opposite direction and the same rotation speed. Accordingly, the left and right carriers 113 engaging with the gears 108 on the turning reversing shafts 106 are rotated on the outer perimeter of the sun gear shaft 103 under the opposite direction and the same rotation speed, whereby the planetary gears 112 are also rotated on the outer perimeter of the sun gear shaft 103 integrally with the carriers 113 under the opposite direction and the same rotation speed. In this case, when the rotation direction of the planetary gears 112 against the carriers 113 is opposite to the rotation direction of the rotation direction of the planetary gears 112 against the sun gear shaft 103, the rotation speeds of the output gears 114 are added up, and if the rotation directions are the same, the rotation speeds of the output gears 114 are subtracted. Then, the rotation of the output gears 114 is outputted to the output shafts 115. Namely, when the steering wheel 7 is operated to turn laterally, the output from the engine 3 changed in speed by the main transmission 50 and passing through the sub transmission 70 and the output passing through the turning HST are combined by the planetary gear mechanism 110, whereby the left and right output shafts 115 (the drive sprockets 11) are driven rotatively while having the difference in speed so that the vehicle turns leftward or rightward.

In the case of turning of the vehicle as the above, the turning radius of the vehicle is determined by the difference of the rotation speed between the left and right output shafts 115. The difference of the rotation speed between the left and right output shafts 115 is changed corresponding to power from the turning HST (the output shaft 68a of the hydraulic motor 68) combined with power from the sub transmission 70 by the planetary gear mechanism 110. With regard to the conventional differential mechanism, the steering wheel is interlocked with the hydraulic pump of the turning HST through a linkage mechanism. The discharge amount of the hydraulic pump of the turning HST is adjusted corresponding to the operation amount of the steering wheel, and then the rotation speed of the output shaft of the hydraulic motor is adjusted corresponding to the discharge amount of the hydraulic pump, whereby the difference of rotation speed of the left and right output shafts is changed. Namely, by adjusting the power inputted from the turning HST to the differential, the difference of rotation speed of the left and right output shafts is changed so as to adjust the turning radius of the vehicle. This construction is also adopted to this embodiment. However, if the rotation speed is changed at the high speed similarly to the case of low speed, the steep turn occurs and the posture becomes unbalanced. Then, the turning handle, the turning HST and the speed change lever are interlocked with each other so that the speed change lever is rotated to the low speed side when the lever is in the high speed position and the turning operation is performed, whereby the turning is performed at low speed. Accordingly, a linkage mechanism for this interlock is complex. Furthermore, the power outputted from the turning HST cannot be utilized maximally and the loss of output is large.

Consequently, with regard to the present invention, as shown in FIG. 11, the main speed change lever 122 is connected to the speed change arm 143 of the turning transmission 140 through the rod 144. Accordingly, when the speed change lever changing the main transmission 50 (or the sub transmission 70) in speed is in the high speed position, the turning transmission 140 is changed to the low speed position, and when the main speed change lever 122 is in the low speed position, the turning transmission 140 is changed to the high speed position.

Therefore, when an operator operates the main speed change lever 122, the turning transmission 140 is also changed in speed so as to change the difference of rotation speed of the left and right output shafts 115, whereby the optimum turning radius corresponding to the vehicle speed is obtained. The output from the turning HST may be at the same pattern whether the vehicle speed is high or low. Accordingly, power can be utilized maximally and the loss of output can be reduced. The linkage mechanism interlocking the hydraulic pump of the turning HST with the steering wheel can be constructed simply. Furthermore, the gear ratio between the input gears 131, 132 and 133 and the output gears 136, 137 and 138 provided in the turning transmission 140, the difference of rotation speed of the left and right output shafts 115 can be set. Moreover, with regard to the vehicle having the differential 100 in the front axle casing 25, the weight of the front portion of the vehicle increases, whereby the longitudinal balance of the vehicle is improved.

Instead of interlocked with the main transmission 50, the mechanical turning transmission 140 may be interlocked with the sub transmission 70 so as to perform the speed change. In this case, the shifter which slides the clutch sliders 141 and 142 of the turning transmission 140 is interlocked with the sub speed change lever 123, which is a means for switching the speed change stage of the sub transmission 70, through a linkage mechanism having a rod or a wire. Accordingly, when the sub speed change lever 123 is operated, not only the speed change stage of the sub transmission 70 is switched so as to perform the sub speed change but also the speed change stage of the turning transmission 140 is switched so as to perform the speed change. Then, in the case of turning the vehicle, the turning feeling corresponding to the speed range is obtained.

With regard to the differential of the vehicle according to the present invention, instead of the mechanical turning transmission, a hydraulic turning transmission may be used. Next, explanation will be given on the embodiment using a hydraulic turning transmission 170 in the differential mechanism according to FIGS. 12 and 13.

Figure 12:
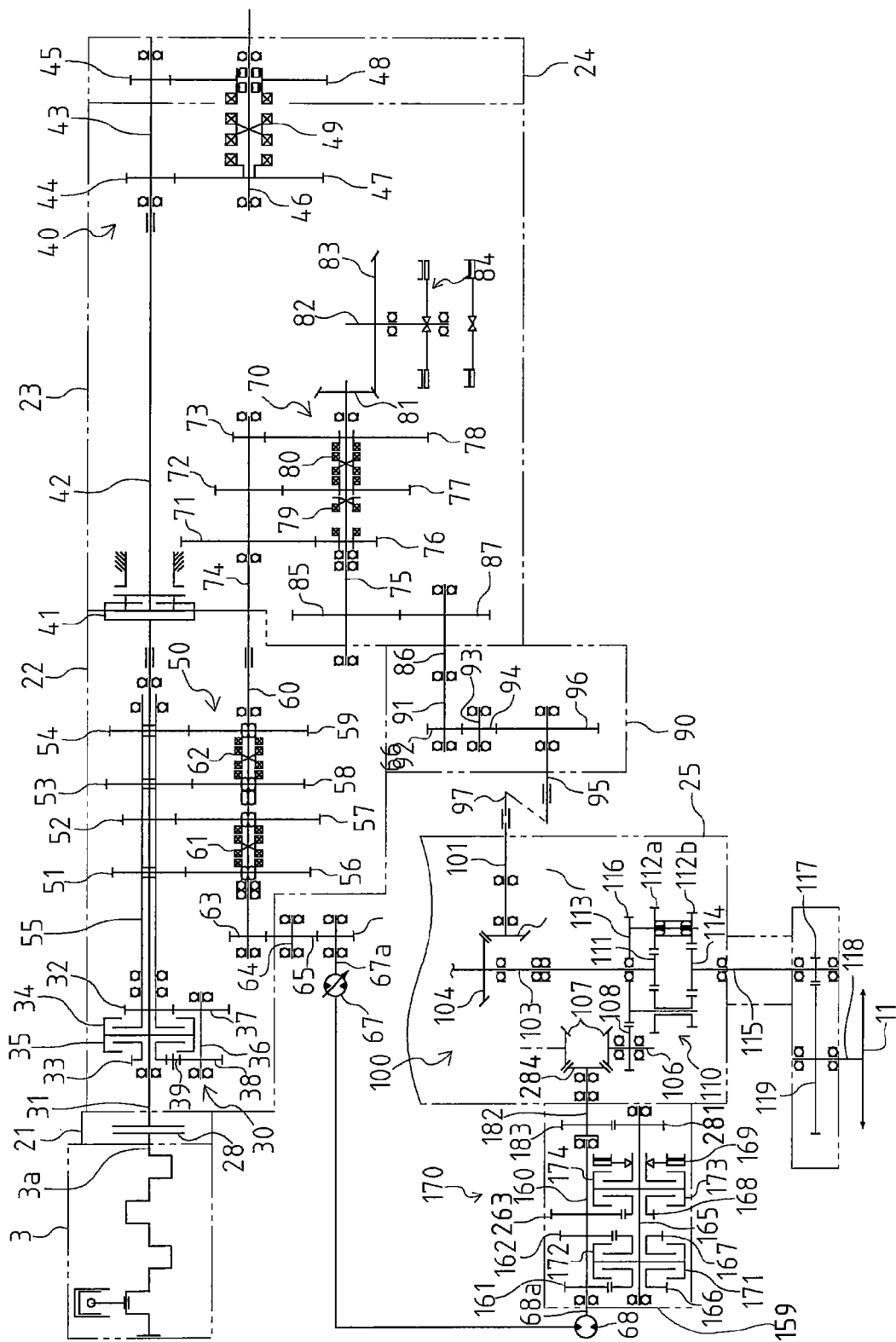
FIG. 12 is a skeleton diagram of the drive transmission route of another embodiment.

As shown in FIG. 12, the hydraulic motor 68 of the turning HST is disposed before the front axle casing 25. A gear casing 159 having the hydraulic turning transmission 170 is arranged between the hydraulic motor 68 and the front axle casing 25. The gear casing 159 and the hydraulic motor 68 are fixed to each other by bolts or the like, and the output shaft 68a of the hydraulic motor 68 is extended rearward and projected into the gear casing 159. In the gear casing 159, an input shaft 160 supported by the gear casing 159 is connected coaxially to the rear end of the output shaft 68a. A first input gear 161, a second input gear 162 and a third input gear 263 are fixed or formed integrally on the input shaft 160. An output shaft 165 is supported by the gear casing 159 parallel to the input shaft 160. A first output gear 166, a second output gear 167 and a third output gear 168 are freely fitted on the output shaft 165. Furthermore, a braking device 169 is arranged on the output shaft 165. The first input gear 161, the second input gear 162 and the third input gear 263 engage respectively with the first output gear 166, the second output gear 167 and the third output gear 168.

Furthermore, a first hydraulic clutch 171 is disposed between the first output gear 166 and the output shaft 165. A second hydraulic clutch 172 is disposed between the second output gear 167 and the output shaft 165. A third hydraulic clutch 173 is disposed between the third output gear 168 and the output shaft 165. A fourth hydraulic clutch 174 is disposed between the braking device 169 and the output shaft 165.

Figure 13:
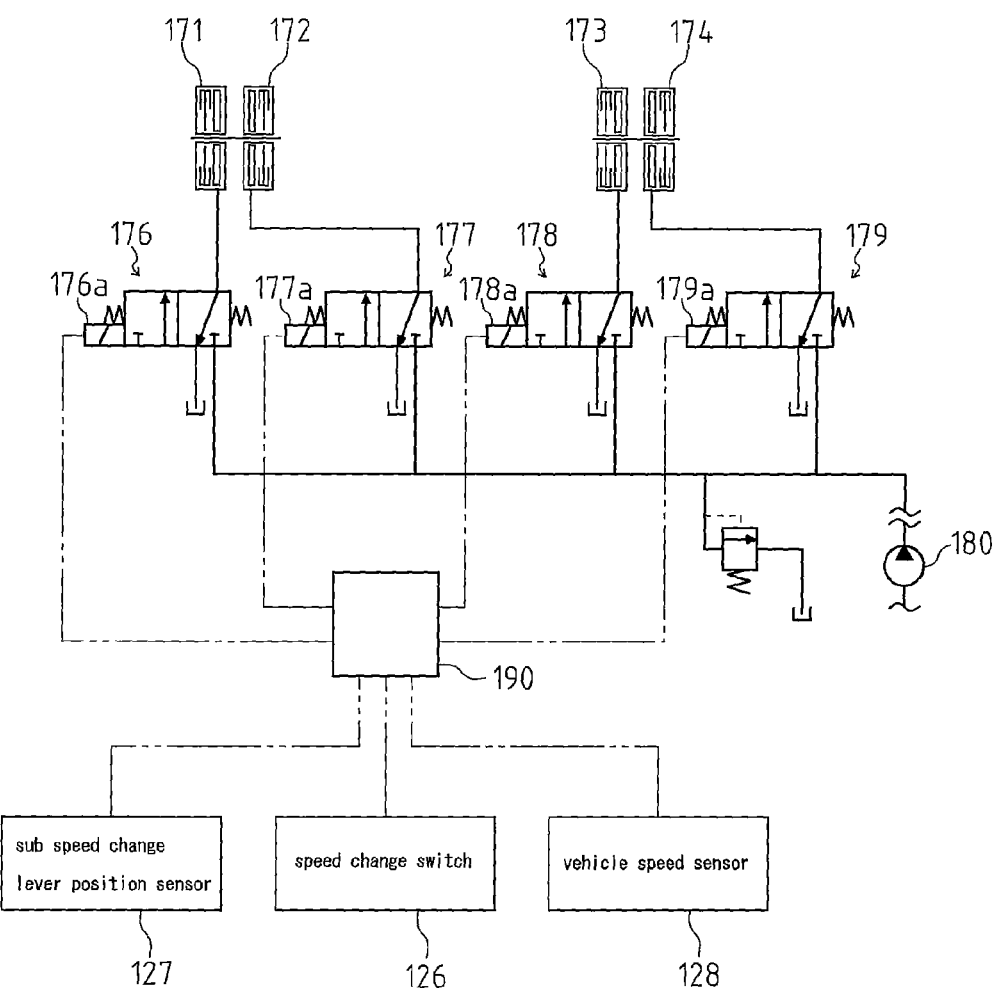
FIG. 13 is a drawing of a hydraulic circuit of a hydraulic turning transmission.

As shown in FIG. 13, the hydraulic clutches 171, 172, 173 and 174 are connected respectively to electromagnetic valves 176, 177, 178 and 179 and are engaged/disengaged by turning on/off the electromagnetic valves 176, 177, 178 and 179 so as to switch the supply of pressure oil from a hydraulic pump 180 to the hydraulic clutches 171, 172, 173 and 174. Solenoids 176a, 177a, 178a and 179a of the electromagnetic valves 176, 177, 178 and 179 are connected to a control device 190.

The control device 190 is connected to a speed change switch 126 provided in the speed change means and detecting the speed change position. However, the speed change switch 126 may alternatively be connected directly to the solenoids 176a, 177a, 178a and 179a of the electromagnetic valves 176, 177, 178 and 179 without interposing the control device 190.

The speed change switch 126 is arranged in the operator part and provided on the main speed change lever 122 or an operation panel on the dashboard 2. When the speed change operation is performed and the speed change switch 126 is turned on, one of the solenoids 176a, 177a, 178a and 179a of the electromagnetic valves 176, 177, 178 and 179 is turned on and the electromagnetic valve thereof is turned on, whereby the hydraulic clutch connected to the electromagnetic valve is engaged. Accordingly, when the steering wheel 7 is operated so as to turn laterally, power of the input shaft 160 is outputted to one of the output gears 166, 167 and 168 on the output shaft 165 by the operation of the speed change switch 126. Then, the power of the input shaft 160 after a change in speed is transmitted from the output gear to the output shaft 165. Namely, the turning transmission 170 is interlocked with the main transmission 50. When the main speed change lever 122 is at the high speed stage, the hydraulic clutch of the low speed side is actuated, and when the speed change lever is at the low speed stage, the hydraulic clutch of the high speed side is actuated.

In addition, when the operation of the steering wheel 7 is kept in the neutral (straight traveling) position, the hydraulic clutch 174 of the turning transmission 170 is engaged and the braking device 169 is actuated, whereby the transmission of power from the turning HST to the differential 100 is intercepted certainly. Accordingly, the ability of straight traveling of the vehicle is improved.

A gear 281 is fixed to the rear end of the output shaft 165, and is engaged with a gear 183 formed at a front end of a shaft 182. The shaft 182 is supported by the front portion of the front axle casing 25 coaxially to the input shaft 130, and the rear end of the shaft 182 is projected into the front axle casing 25. A bevel gear 284 formed at the rear end of the shaft 182 engages with the bevel gears 107 fixed to the left and right turning reversing shafts 106.

The turning transmission 170 is constructed as the above. When the steering wheel 7 is operated so as to turn laterally, power from the turning HST is changed in speed by the turning transmission 170, transmitted to the differential 100, and then combined with power from the sub transmission 70 by the planetary gear mechanism 110, whereby the difference of rotation speed is provided between the left and right output shafts 115. Accordingly, in the case of using the hydraulic turning transmission 170 in the differential mechanism, even if the steering wheel 7 is operated so as to turn laterally, power outputted from the turning HST can be adjusted so as to change the turning radius of the vehicle by operating the speed change means so as to perform the speed change of the hydraulic turning transmission 170. It is not necessary to provide any linkage mechanism comprising rod or the like interlocking the turning transmission 170 with the speed change switch 126, whereby the turning transmission 170 can be interlocked with the speed change switch 126 by a simple construction.

As shown in FIG. 13, in addition to the solenoids 176a, 177a, 178a and 179a of the electromagnetic valves 176, 177, 178 and 179, a sub speed change lever position sensor 127 detecting the operation position of the sub speed change lever 123 may be connected to the control device 190. Then, corresponding to the detected value of the sub speed change lever position sensor 127, the electromagnetic valves 176, 177, 178 and 179 are controlled by the control device 190 so as to perform the speed change of the turning transmission 170 interlockingly with the sub transmission 70. In this case, when the sub speed change lever 123 is operated, not only the speed change stage of the sub transmission 70 is switched so as to perform the sub speed change but also the speed change stage of the turning transmission 170 so as to perform the speed change. Then, in the case of turning the vehicle, the turning feeling corresponding to the speed range is obtained. In addition, the status of the speed change of the turning transmission 170 performed corresponding to the speed change of the sub transmission 70 can be set optionally by the control device 190. Similarly, the turning transmission 170 may be constructed to be interlocked with the main transmission 50.

Otherwise, in addition to the solenoids 176*a*, 177*a*, 178*a* and 179*a* of the electromagnetic valves 176, 177, 178 and 179, a vehicle speed sensor 128 detecting the vehicle speed may be connected to the control device 190. Then, corresponding to the detected value of the vehicle speed sensor 128, the electromagnetic valves 176, 177, 178 and 179 are controlled by the control device 190 so as to perform the speed change of the turning transmission 170.

Next, explanation will be given of the hydraulic circuit according to FIGS. 14 to 17.

With regard to the tractor, pressure oil also serving as lubricating oil is stored in the transmission casing 23 also serving as a pressure oil tank. Hydraulic pumps 151 and 152 which pressingly send the pressure oil to each hydraulic device are disposed near the engine 3. The hydraulic pumps 151 and 152 are driven by power from the engine 3 and suck pressure oil from the transmission casing 23.

Pressure oil sucked from the transmission casing 23 by driving the hydraulic pumps 151 and 152 passes through suction strainer 153 and 154, and then is branched off to two directions. Pressure oil discharged from the hydraulic pump 151 is pressingly sent to flow divider 155. Then, a part of the pressure oil divided by the flow divider 155 is pressingly sent to a PTO clutch unit 156 controlling the PTO clutch 41, and the other part of the pressure oil is pressingly sent to an outer hydraulic pressure extraction part 157 and then pressingly sent to a working machine vertical movement control unit 158.

Pressure oil discharged from the hydraulic pump 152 is pressingly sent through a piping 271 to a flow divider 261, and then is branched off to two directions by the flow divider 261. A part of the pressure oil divided by the flow divider 261 is pressingly sent through a piping 272 to a clutch valve 262 interlocked with the clutch pedal, and then supplied through the reverser control valve 163, interlocked to the reverser lever 121, to the hydraulic clutches 34 and 35 of the forward/rearward traveling switching device 30. When each of the hydraulic clutches 34 and 35 is engaged by switching the reverser control valve 163, the switch of forward/rearward traveling of the vehicle is performed. When both of the hydraulic clutches 34 and 35 are disengaged, the power transmission is intercepted.

The other part of the pressure oil divided by the flow divider 261 is filtrated by a filter 164 and is supplied through a piping 273 to the turning HST 69. Then, pressure oil returning from the turning HST 69 is pressingly sent through pipings 274 and 275 to an oil cooler 265, and then pressed and discharged through a piping 276 to the part of frictional boards (clutch boards) of the hydraulic clutches 34 and 35 of the forward/rearward traveling switching device 30 for the lubrication. Accordingly, pressure oil is returned into the transmission casing 23. Namely, the pressure oil returning from the turning HST 69 is cooled in the oil cooler 265, and then returned into the transmission casing 23.

Accordingly, the pressure oil cooled in the oil cooler 265 is returned directly to the transmission casing 23 without passing through the reverser control valve 163 or the like, whereby oil pressure loss becomes small and cooling effect is improved. Furthermore, the inside of the transmission casing 23 can be cooled efficiently by the pressure oil cooled by the oil cooler 265. The pressure oil returning from the turning HST 69 is supplied through the oil cooler 265 to the part of the frictional boards of the hydraulic clutches 34 and 35, whereby the hydraulic clutches 34 and 35 are cooled and the frictional characteristics thereof are stabilized.

The circuit between the turning HST 69 and the transmission casing 23 is branched and provided thereon with a piping 277 through a relief valve 266. Accordingly, if the oil cooler 265 is clogged, pressure oil from the turning HST 69 bypasses the oil cooler 265 and is returned through the relief valve 266 and the piping 277 to the transmission casing 23.

Figure 18:
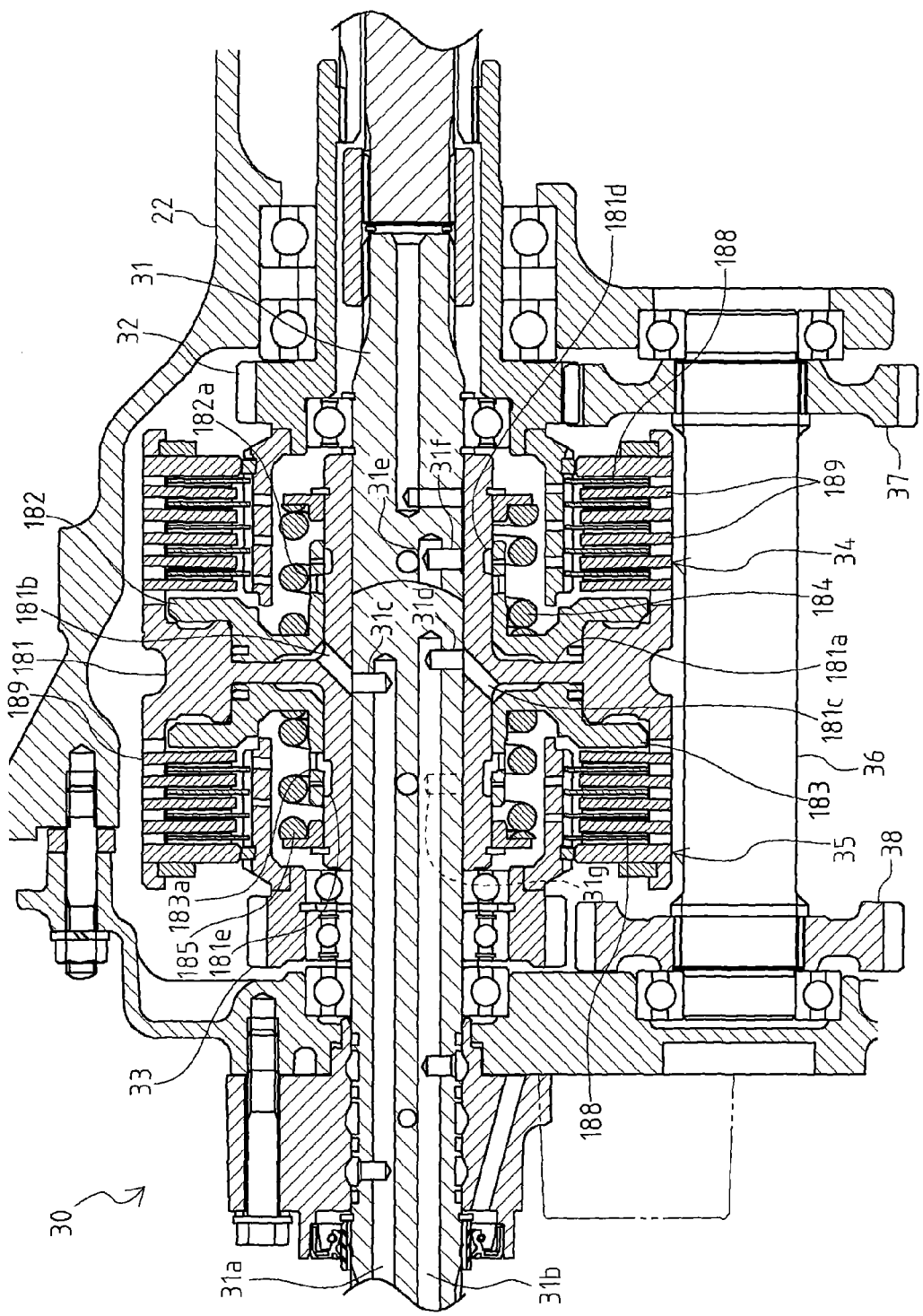
FIG. 18 is a sectional side view of a forward/rearward traveling switching device.

Next, explanation will be given on the forward/rearward traveling switching device 30 in detail according to FIG. 18.

As mentioned above, the normal rotation gear 32 and the reverse rotation gear 33 are freely fitted on the main shaft 31 through bearings or the like. The forward traveling hydraulic clutch 34 is disposed between the normal rotation gear 32 and the main shaft 31, and the rearward traveling hydraulic clutch 35 is disposed between the reverse rotation gear 33 and the main shaft 31. Each of the forward traveling hydraulic clutch 34 and the rearward traveling hydraulic clutch 35 is a frictional clutch having frictional boards and is engaged/disengaged by a hydraulic actuator. The hydraulic actuator comprises a cylinder 181 which is a clutch casing and pistons 282 and 283. The cylinder 181 is fixed to the main shaft 31 at the position between the normal rotation gear 32 and the reverse rotation gear 33. The inside of the cylinder 181 is divided into two sides by a partition wall 181*a* formed at the substantial lateral center thereof. The piston 282 is slidably inserted into one of the divided parts at the side of the normal rotation gear 32, and the piston 283 is slidably inserted into the other divided part at the side of the reverse rotation gear 33.

A spring 184 as an elastic body is interposed between the piston 282 and a spring shoe provided in the cylinder 181, and a spring 185 as an elastic body is interposed between the piston 283 and a spring shoe provided in the cylinder 181. By the springs 184 and 185, the pistons 282 and 283 are biased to the partition wall 181*a* at the substantial lateral center of the cylinder 181 so as to disengage the clutch.

Frictional boards 188 and 189 are provided mutually between the boss part of the normal rotation gear 32 and the inner perimeter of the cylinder 181, and frictional boards 188 and 189 are provided mutually between the boss part of the reverse rotation gear 33 and the inner perimeter of the cylinder 181. These frictional boards 188 and 189 can be pressed by the pistons 282 and 283, whereby the hydraulic clutches 34 and 35 are constructed. The pistons 282 and 283 are usually biased to be contracted by the springs 184 and 185 so as not to press the frictional boards 188 and 189.

In the main shaft 31, oil passages 31*a* and 31*b* are bored axially and connected to the reverser control valve 163, and oil passages 31*c* and 31*d* are bored radially and connected to the oil passages 31*a* and 31*b*. Furthermore, oil passages 181*b* and 181*c* are bored from the inner perimeter of the cylinder 181 along the piston, whereby the oil passages 181*b* and 181*c* are respectively communicated with the oil passages 31*c* and 31*d*. Accordingly, by switching the reverser control valve 163, pressure oil from the hydraulic pump 151 is pressingly sent through the oil passages 31*a*, 31*c* and 181*b* to the space between the inner wall of the cylinder 181 and the piston 282 of the forward traveling hydraulic clutch 34, and is pressingly sent through the oil passages 31*b*, 31*d* and 181*c* to the space between the inner wall of the cylinder 181 and the piston 283 of the rearward traveling hydraulic clutch 35.

Furthermore, in the main shaft 31, an oil passage 31e is bored axially and connected to the oil cooler 265, and oil passages 31f and 31g are bored radially and connected to the oil passage 31e. Oil passages 181d and 181e are provided on the cylinder 181 and communicated with the oil passages 31f and 31g. Oil passages 182a and 183a are provided respectively in the boss parts of the pistons 282 and 283 and communicated respectively with the oil passages 181d and 181e. Accordingly, pressure oil returning from the oil cooler 265 is pressingly sent to the part in which the frictional boards 188 and 189 of the hydraulic clutches 34 and 35 are housed (the inside of the clutch housing 22) through the oil passages 31e, 31f, 181d and 182a or the oil passages 31e, 31g, 181e and 183a.

With regard to the above-mentioned construction, the number of the frictional boards 188 and 189 provided in the hydraulic clutch 34 is different from that provided in the hydraulic clutch 35. Also, the amount of pressure oil supplied to the hydraulic clutch 34 is different from that supplied to the hydraulic clutch 35. In this embodiment, with regard to the two hydraulic clutches, the capacity of the forward traveling hydraulic clutch 34 is larger and the number of the frictional boards thereof is also more, and a greater amount of pressure oil is supplied thereto. Namely, the forward traveling hydraulic clutch 34 has more frictional boards 188 and 189 than the rearward traveling hydraulic clutch 35 and is supplied thereto with more amount of pressure oil than the rearward traveling hydraulic clutch 35.

Though the number of the frictional boards 188 and 189 is different between the forward traveling hydraulic clutch 34 and the rearward traveling hydraulic clutch 35, by supplying more pressure oil to the hydraulic clutch 34 having more frictional boards, the drag of the forward traveling hydraulic clutch 34 and the rearward traveling hydraulic clutch 35 can be prevented. Accordingly, the number of the frictional boards can be minimized and any braking device is not required. As a result, the cost can be reduced.

The supply amount of pressure oil to the forward traveling hydraulic clutch 34 and the rearward traveling hydraulic clutch 35 is adjusted by changing the size of the oil passages. In this embodiment, the oil passage 181d provided at the side of the forward traveling hydraulic clutch 34 in the cylinder 181 is constructed larger than the oil passage 181e provided at the side of the rearward traveling hydraulic clutch 35 so that more pressure oil is supplied to the forward traveling hydraulic clutch 34 than the rearward traveling hydraulic clutch 35. Namely, by processing only to change the size of the oil passages, the supply amount of pressure oil to each hydraulic clutch can be adjusted easily.

<Upper Portion of Equalizer 20>

Now, explanation will be given of the track rollers 13 according to FIG. 19.

Figure 19:
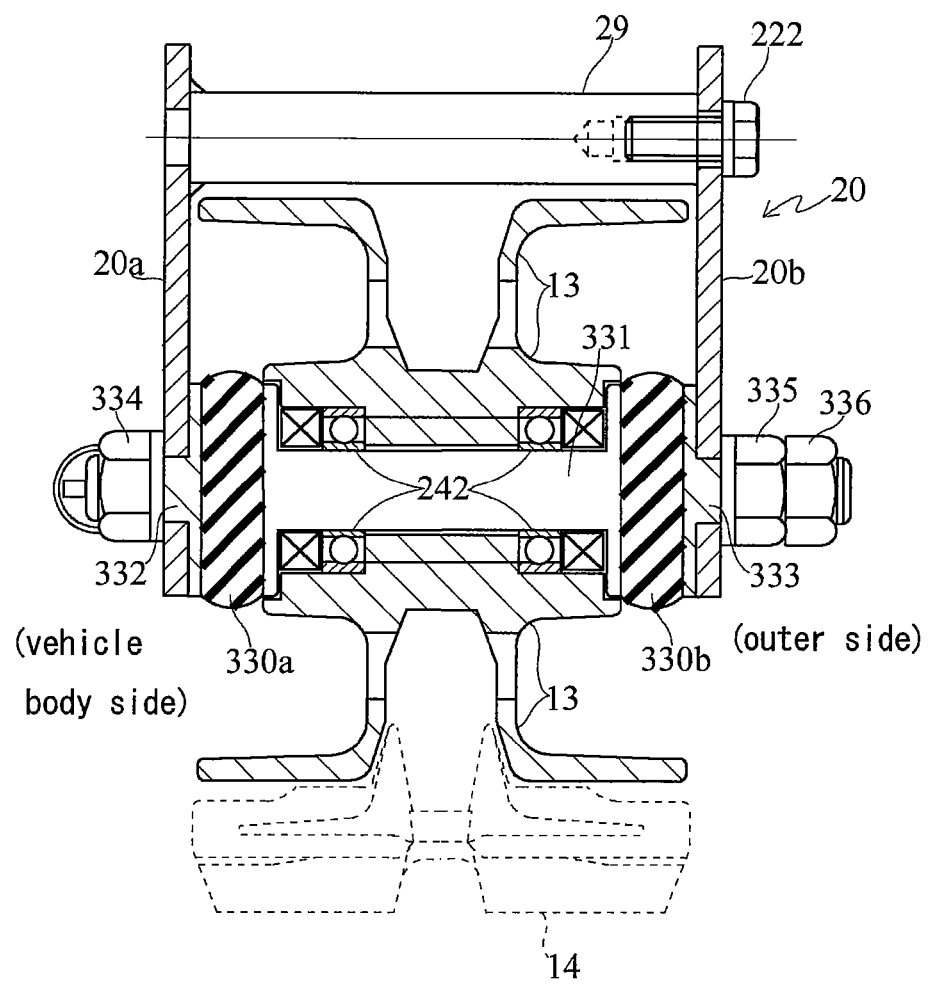
FIG. 19 is a sectional view of a track roller.

FIG. 19 is a sectional view of the track rollers 13 viewed along the traveling direction of the crawler traveling unit 1.

Figure 2:
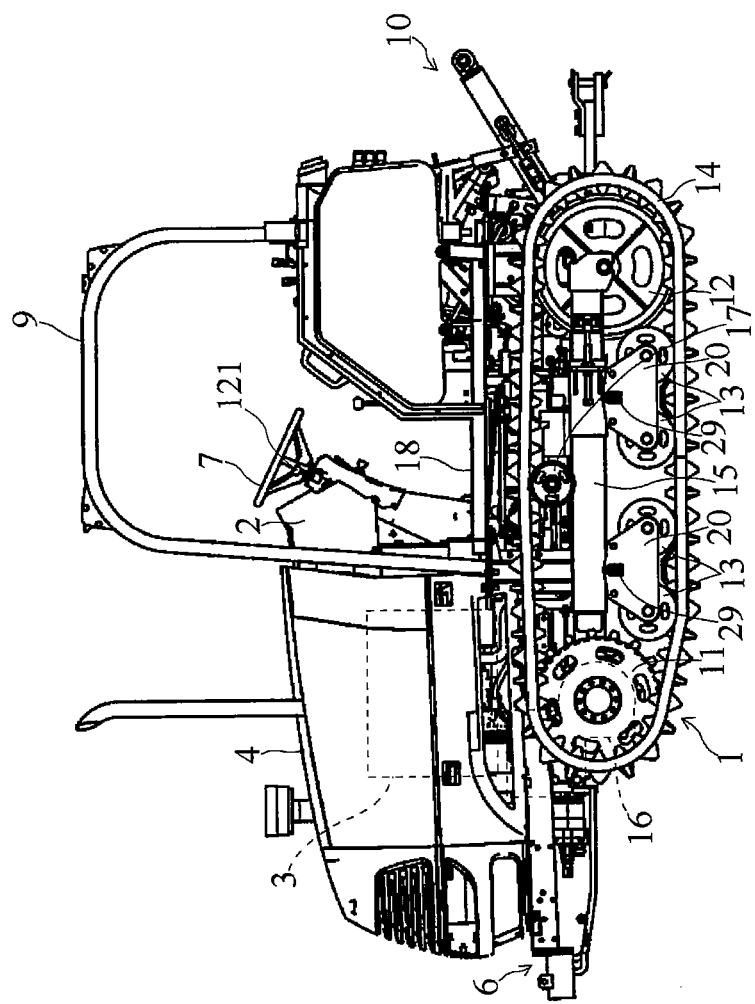
FIG. 2 is a side view of the tractor shown in FIG. 1.

The right side in FIG. 19 is the side portion (outer side) shown in FIG. 2, and the left side in FIG. 19 is the inner side of the crawler traveling unit 1 (vehicle side). In addition, the cross section of the wound crawler belt 14 is shown by dotted lines at the lower portion of FIG. 19.

Each of the equalizers 20 comprises equalizer boards 20a (vehicle side) and 20b (outer side), and the upper portion thereof is penetrated by the rocking shaft 29. The rocking shaft 29 is rotatably held by a bolt 222 or the like so as not to shift in the axial direction.

The rocking shaft 29 is fixed to the frame, such as the track frame 15, which is the base of the crawler traveling unit 1.

According to this construction, the equalizer 20 can be rocked centering on the rocking shaft 29 along the traveling direction (longitudinal direction).

<Lower Portion of Equalizer 20>

In the lower portion of the equalizer 20, shafts 331 are longitudinally provided in parallel to each other so as to support the track rollers 13 rotatably through a bearing 242.

The shafts 331 don't penetrate the equalizer boards 20a and 20b directly.

Elastic members 330a and 330b are provided at the both ends of the shaft 331, and shafts 332 and 333 penetrating the equalizer boards 20a and 20b are connected through the elastic members 330a and 330b.

The shafts 332 and 333 are screwed to the equalizer boards 20a and 20b by nuts 334, 335 and 336 or the like.

Namely, the shaft supporting the track rollers 13 is divided into three, the shafts 331, 332 and 333, and the divided shafts are connected to each other through the elastic members 30a and 30b and arranged on the same axis, whereby the shaft 331 can be provided in the equalizer 20.

In other words, the shafts divided into plural parts in the axial direction are connected to each other through the elastic members.

As the elastic members 330a and 330b, rubber flexible couplings, vibration-proof rubber member or any member made by a material known to be used for vibration-proofing may be used.

According to this construction, impact and vibration put on the track rollers 13 are absorbed by the elastic members 330a and 330b, whereby the propagation of vibration to the equalizer boards 20a and 20b is suppressed.

Then, impact put on the crawler belt 14 from the traveling field is suppressed to be transmitted to the crawler traveling unit 1 through the shaft supporting the track rollers 13 or the equalizer so as to vibrate the whole crawler tractor.

<Upper Portion of Equalizer 290>

Next, explanation will be given of another embodiment different from the case shown in FIG. 19 according to FIG. 20.

Figure 20:
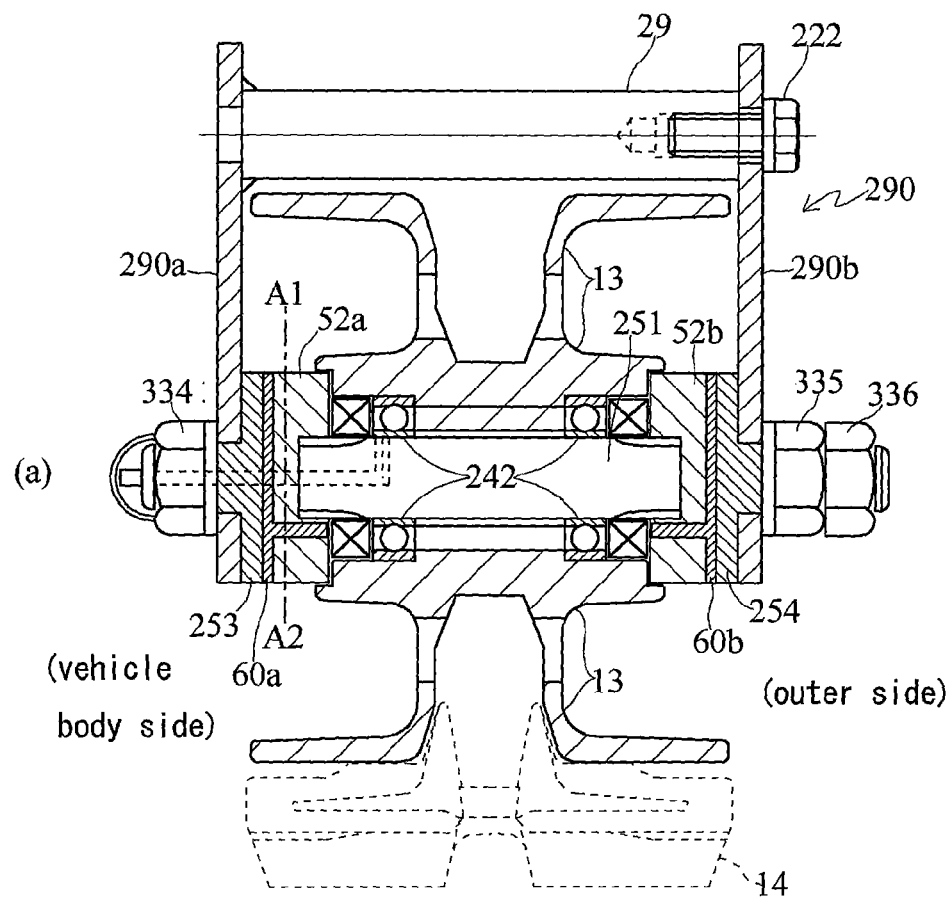
FIG. 20 is a sectional view of a modification of a track roller different from that in FIG. 19.
Figure 20:
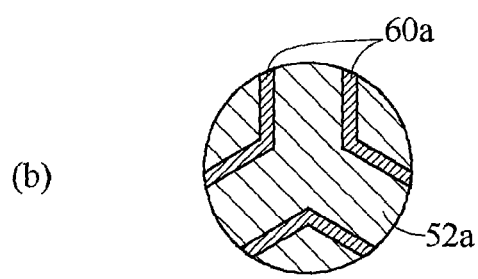

In addition, with regard to FIG. 20, components having the same function and effect as explained in FIG. 19 are indicated by the same numerals in FIG. 19.

FIG. 20(*a*) is a sectional view of the track rollers 13 viewed along the traveling direction of the crawler traveling unit 1 similarly to FIG. 19. FIG. 20(*b*) is an arrow sectional view of the line A1-A2 in FIG. 20(*a*).

Each of equalizers 290 comprises equalizer boards 290a (vehicle side) and 290b (outer side), and the upper portion thereof is penetrated by the rocking shaft 29. The rocking shaft 29 is rotatably held by a bolt 222 or the like so as not to shift in the axial direction.

The rocking shaft 29 is fixed to the frame, such as the track frame 15, which is the base of the crawler traveling unit 1.

According to this construction, the equalizer 290 can be rocked centering on the rocking shaft 29 along the traveling direction (longitudinal direction).

<Lower Portion of Equalizer 290>

In the lower portion of the equalizer 290, a shaft 251 is longitudinally provided in parallel to each other so as to support the track rollers 13 rotatably through a bearing 242.

The shaft 251 doesn't penetrate the equalizer boards 290a and 290b directly.

Engaging members 52a and 52b are spline-fitted to both ends of the shaft 251. On the other hand, shafts 253 and 254 which can be engaged with the engaging members 52a and 52b are provided so as to penetrate the equalizer boards 290a and 290b.

The shafts 253 and 254 are provided so as to penetrate the equalizer boards 290a and 290b and are screwed to the equalizer boards 20a and 20b by nuts 334, 335 and 336 or the like.

Namely, with regard to the engagement of the engaging members 52a and 52b with the shafts 253 and 254, the shafts are connected to each other by interposing elastic members 60a and 60b there between.

Namely, similarly to the case in FIG. 19, the shafts divided into plural parts in the axial direction are connected to each other through the elastic members.

Next, explanation will be given of the above-mentioned engagement in detail.

As an example of the above-mentioned engagement, explanation will be given of the relation among the engaging member 52a, the shaft 253 and the elastic member 60a according to FIG. 21.

Figure 21:
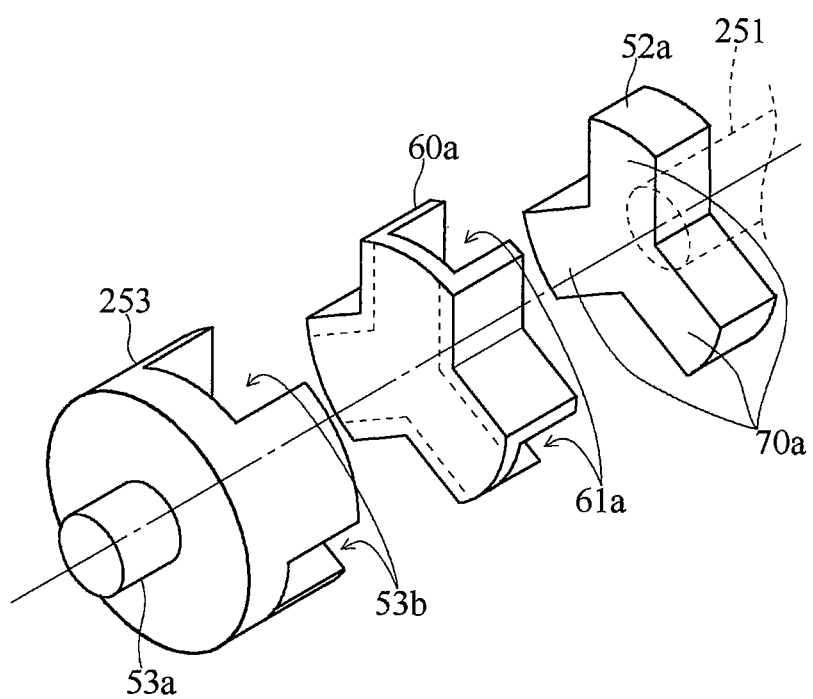
FIG. 21 is a detail drawing of the engagement of the shafts of the track roller in FIG. 20.

As shown in FIG. 21, the engaging member 52a has three projections 70a and is spline-fitted to the shaft 251 so as to be fixed thereto.

Next, the schematic outline of the elastic member 60a is substantially similar to that of the engaging member 52a and is slightly larger than the engaging member 52a.

A hollow 61a whose size is the same as the outline of the engaging member 52a is formed in the elastic member 60a so that the engaging member 52a is inserted thereto.

The shaft 253 is inserted into the penetration hole of the equalizer board 290a and comprises a shaft part 53a threaded to be screwed to the nut 334 and an engaging part 53b which is a hollow to which the elastic member 60a engaged with the engaging member 52a is inserted.

Namely, the schematic outline of the engaging part 53b of the shaft 253 is substantially similar to the elastic member 60a and is slightly larger than the elastic member 60a, and the engaging part 53b is hollow-shaped similarly to the hollow 61a.

As mentioned above, the engagement is constructed by three members, the engaging member 52a, the shaft 253 and the elastic member 60a. The engaging member 52a is inserted into the hollow 61a of the elastic member 60a and then the elastic member 60a engaged with the engaging member 52a is inserted into the engaging part 53b of the shaft 253.

Namely, the shaft 251 (including the engaging member 52a) engages with the shaft 253 through the elastic member 60a by meshing.

This construction is similar to the relation among the shaft 251, the engaging member 52b, the shaft 254 and the elastic member 60b.

According to the above-mentioned construction, the shaft 251 is connected through the elastic members 60a and 60b to the shafts 253 and 254 so as to be supported by the equalizer boards 290a and 290b of the equalizer 290.

Namely, the track rollers 13 are supported by the equalizer 290 through the shaft 251.

That is, with regard to the construction shown in FIGS. 20 and 21, similarly to the case in FIG. 19, the shaft supporting the track rollers 13 is divided into the shaft 251 (including the engaging members 52a and 52b) and the shafts 253 and 254, and the divided shafts are connected to each other through the elastic members 60a and 60b.

Similarly to the case in FIG. 19, as to the elastic members 60a and 60b, rubber flexible couplings, vibration-proof rubber member or any member made by a material known to be used for vibration-proofing may be used.

According to this construction, impact and vibration put on the track rollers 13 are absorbed by the elastic members 60a and 60b, whereby the propagation of vibration to the equalizer boards 290a and 290b is suppressed.

Namely, impact put on the crawler belt 14 from the traveling field is suppressed to be transmitted to the crawler traveling unit 1 through the shaft supporting the track rollers 13 or the equalizer so as to vibrate the whole crawler tractor.

The shafts (the shaft 251 (including the engaging members 52a and 52b) and the shafts 253) are formed so that they are easy to be engaged with each other, whereby the shafts can be engaged with each other easily.

Since the shafts are engaged with each other by meshing, the shaft 251 (including the engaging members 52a and 52b) and the shafts 253 can be aligned automatically by the rotation or vibration of the track rollers 13.

In this case, the engagement is formed only by meshing and does not require any bolt and nut so that the part number is suppressed, whereby the cost can be reduced and working processes in manufactural course can be simplified.

Figure 22:
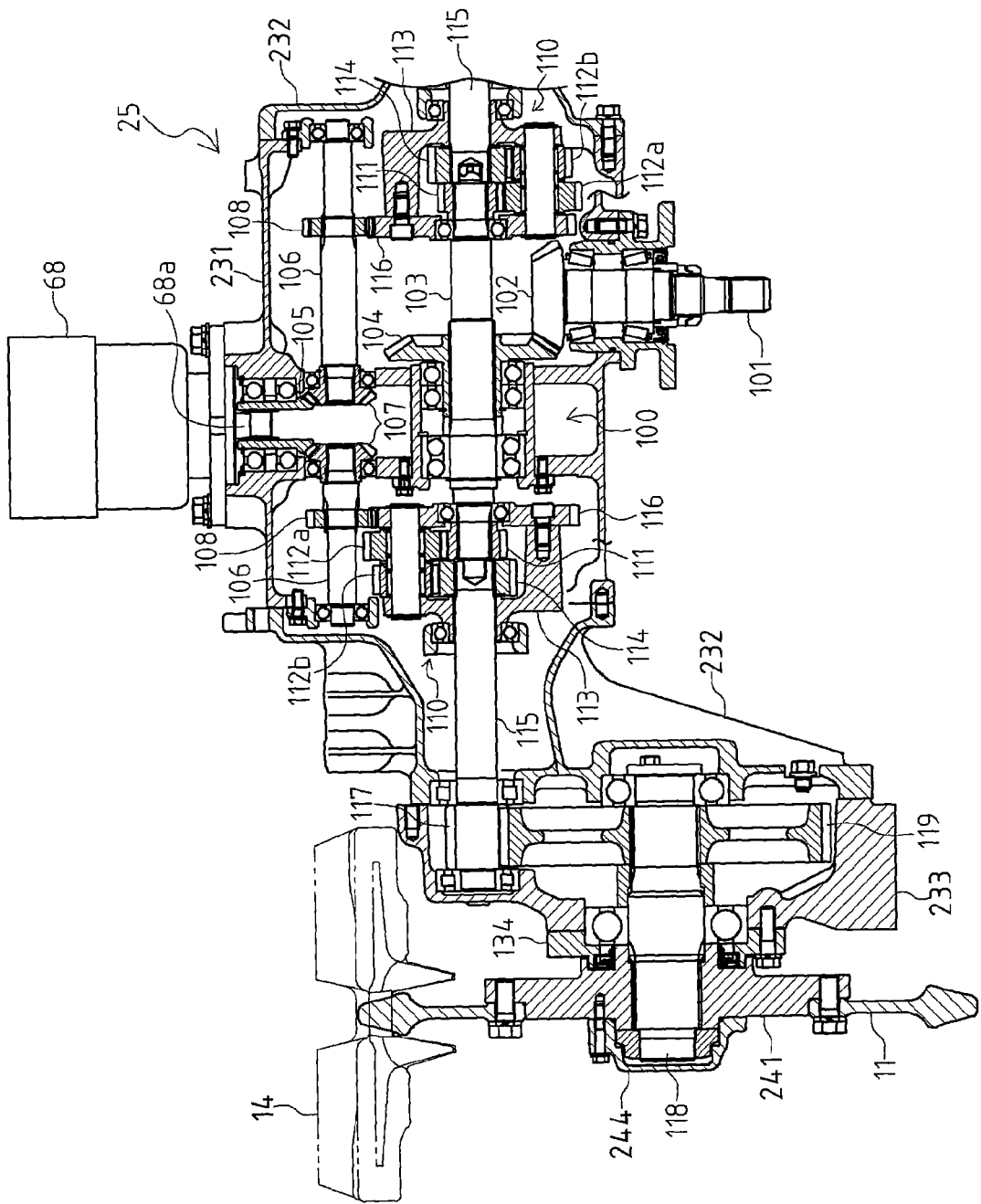
FIG. 22 is a sectional plan view of the front axle casing.
Figure 23:
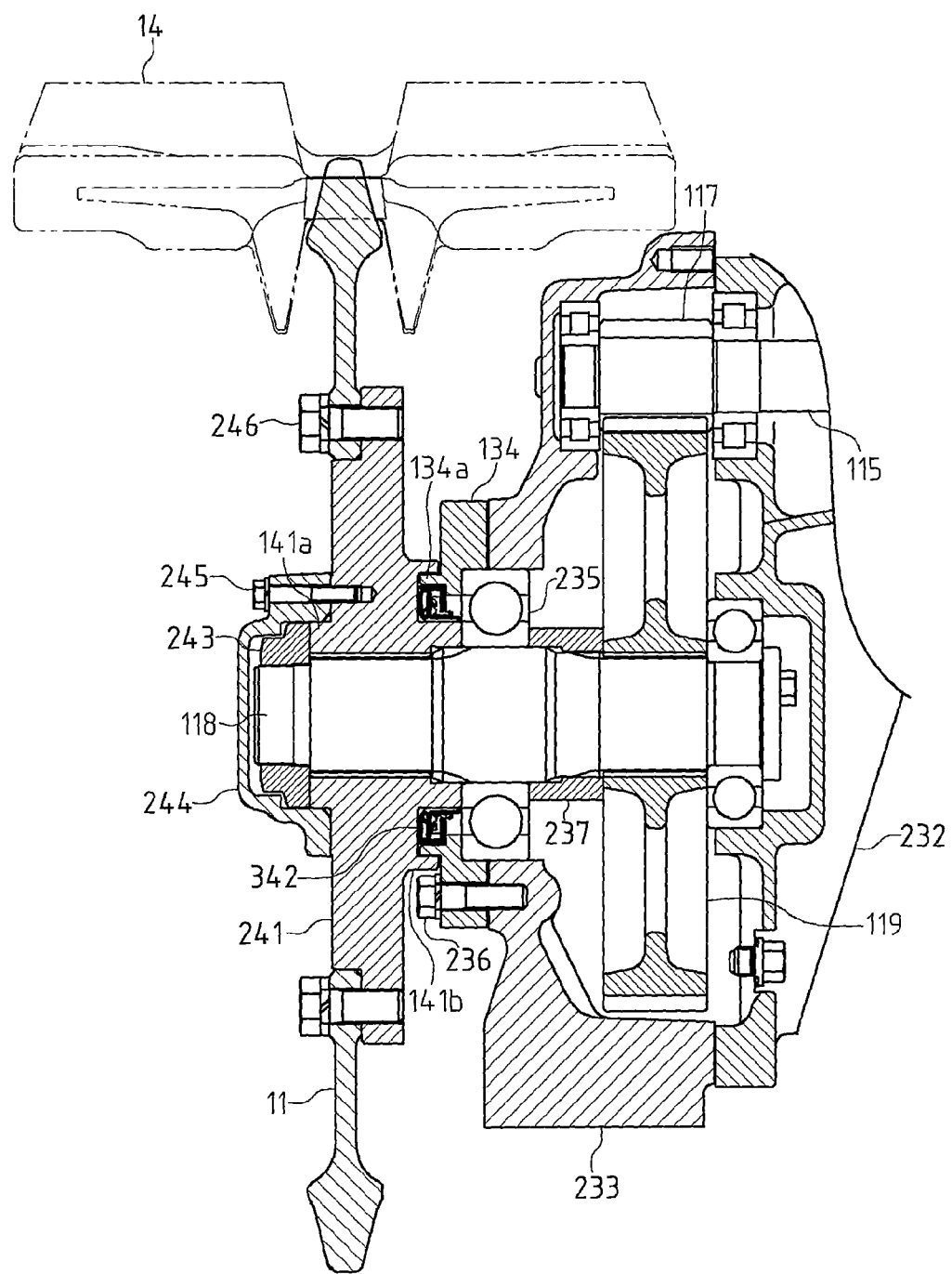
FIG. 23 is a sectional plan view of the gear casing.

Now, as shown in FIGS. 22 and 23, the front axle casing 25 comprises a casing 231 covering the differential 100, casings 232 provided at both lateral ends of the casing 231 so as to cover the left and right output shafts 115, and gear casings 233 provided at the outer ends of the casings 232 so as to cover the input gear 117 and the output gear 119. A cylindrical seal holding member 134 is provided at the outer end of each gear casing 233. The seal holding member 134 touches an outer ring of a bearing 235 engaged with the edge of the outer opening of the gear casing 233 and is fixed to the gear casing 233 by bolts 236. In addition, since the gear casings 233 are constructed substantially laterally symmetrically, the explanation of the right side gear casing is omitted.

The drive shaft 118 is rotatably supported by the bearing 235, and the tip thereof is projected to the outside from the gear casing 233 while penetrating the seal holding member 134. As mentioned above, the output gear 119 is fixed to the drive shaft 118 inside the gear casing 233. A collar 237 is engaged between the output gear 119 and the bearing 235 while the left and right side surfaces of the collar 237 touch the side surfaces of the output gear 119 and the bearing 235 respectively.

On the other hand, outside the gear casing 233, a hub 241 is spline-fitted on the drive shaft 118 so as not to be rotatable relatively and to be slidable along the axial direction by making a boss part 141a of the hub 241 touch the inner ring surface of the bearing 235. An inner edge 141b formed cylindrically at the outer side of the boss part 141a of the hub 241 is engaged with outside of a cylindrical outer end 134a of the seal holding member 134 on the outer perimeter of the boss part 141a. A seal member 342 is provided outward of the bearing 235, between the inner peripheral surface of the outer end 134a of the seal holding member 134 and the outer peripheral surface of the boss part 141a of the hub 241. Then, the drive sprocket 11 of the crawler traveling unit 1 is attached to the outer perimeter of the hub 241 by bolts 246.

Accordingly, on the outer perimeter of the drive shaft 118, the output gear 119, the collar 237, the bearing 235, the seal holding member 134, the seal member 342 and the hub 241 are arranged in this order from the inside of the gear casing 233. These members are screwed to the axial direction of the drive shaft 118 and fixed by a nut 243 arranged outside the hub 241.

The nut 243 is covered by a cover 244 so as not to be exposed outside. The cover 244 is fixed to the hub 241 by bolts 245 so as to protect the nut 243 and the outer end of the drive shaft 118 from muddy water of the outside and the like, and to prevent the slack of the nut 243.

With regard to the above construction, by removing the bolts 245 so as to remove the cover 244 from the hub 241 and then removing the nut 243 screwed to the outer end of the drive shaft 118, the hub 241 can be removed from the drive shaft 118 while the drive shaft 118 is supported by the gear casing 233 so as to remove the seal member 342 disposed between the hub 241 and the seal holding member 134. Subsequently, by removing the bolts 236 fixing the seal holding member 134 so as to remove the seal holding member 134 from the gear casing 233, the bearing 235 can be removed. Namely, the seal member 342 and the bearing 235 used for the drive shaft 118 can be exchanged without disassembling the main body of the gear casing 233 so that the working processes are reduced and the exchange work becomes easy, thereby improving maintainability.

Conventionally, since the drive shaft and the hub are constructed integrally, it is necessary to exchange both the drive shaft and the hub even if either thereof is required to be exchanged. However, with regard to the present invention, the drive shaft and the hub are separated so that either thereof can be exchanged, whereby the drive shaft or the hub can be exchanged easily and the cost for the exchange can be reduced.

Figure 24:
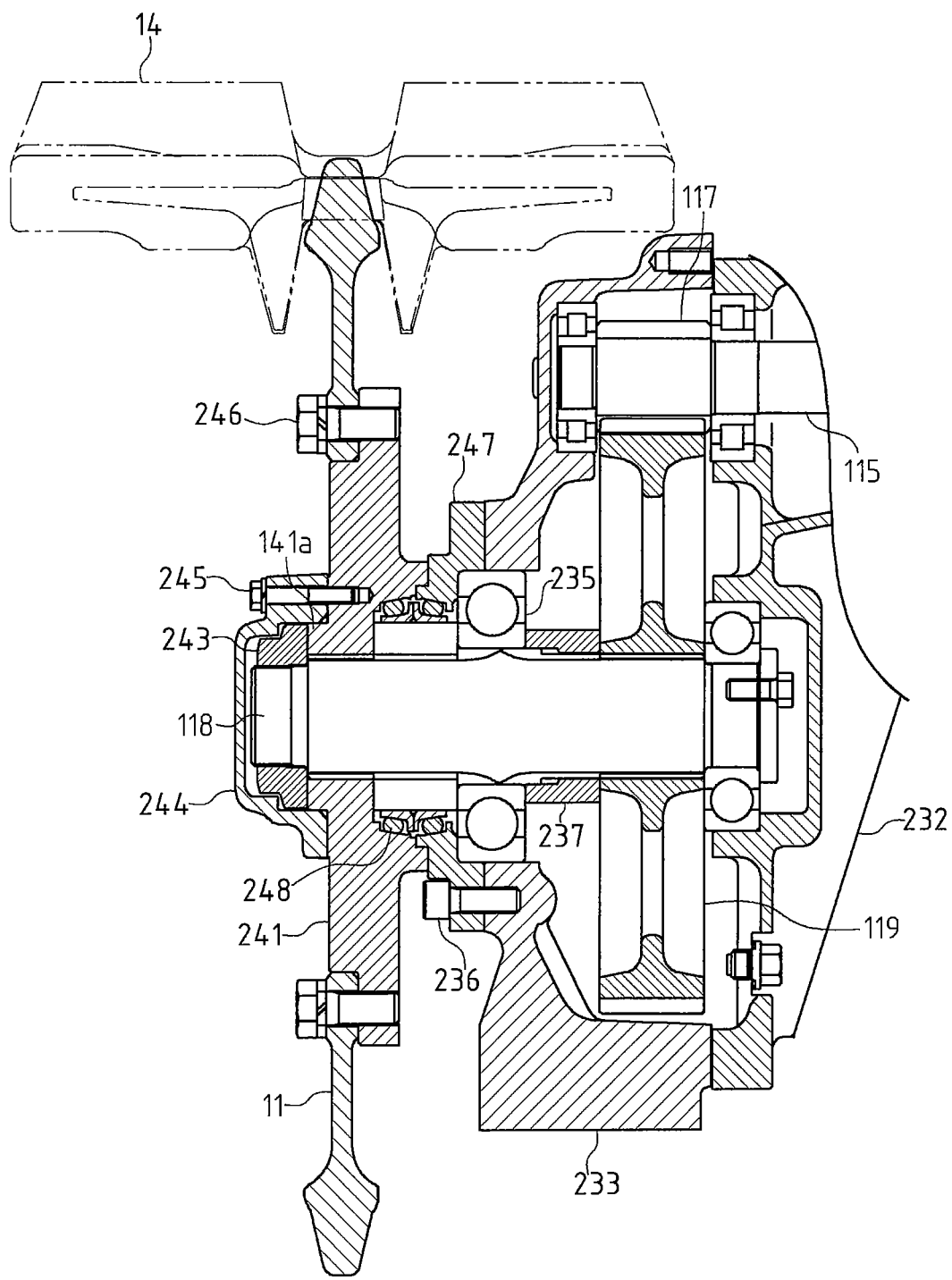
FIG. 24 is a sectional plan view of the gear casing of another embodiment.

Furthermore, in the case of changing the seal member 342 corresponding to the cost or the condition of manufactural work, each kind of seal member can be accommodated flexibly only by exchanging the seal holding member 134. For example, though an oil seal is used as the seal member 342 in the above-mentioned embodiment, by exchanging the seal holding member 134 for a seal holding member 247 shown in FIG. 24, a mechanical seal having higher durability can be used as a seal member 248 instead of the oil seal.

Figure 26:
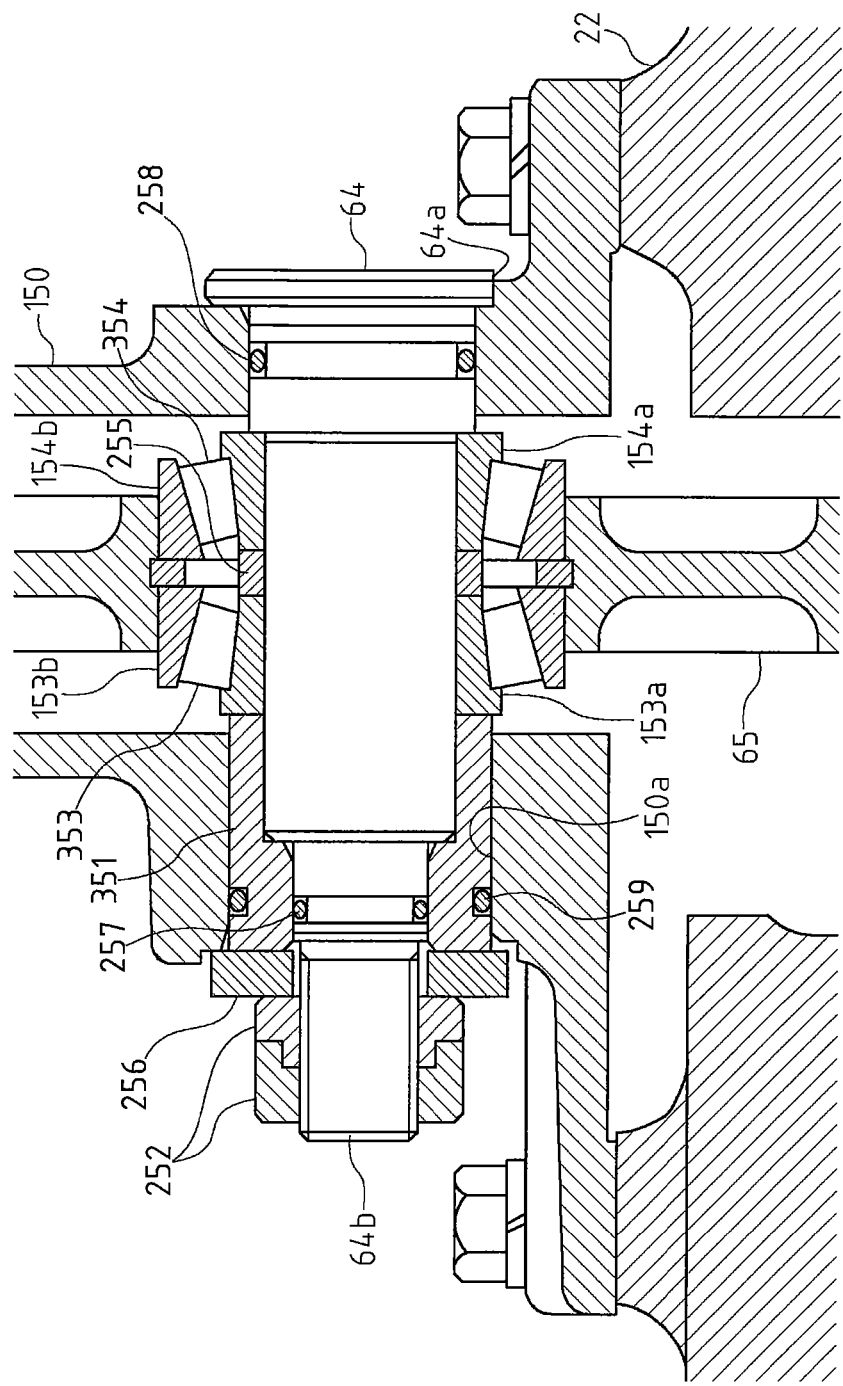
FIG. 26 is a sectional view of a preload mechanism of a bearing.

Next, explanation will be given of the gear casing 150 according to FIGS. 25 and 26.

An opening for power take-off is provided on the side surface of the clutch housing 22, and the gear casing 150 is attached so as to close this opening. The gear casing 150 is fixed to the front portion of the hydraulic pump 67 of the turning HST, and the end of the inner side (vehicle side) thereof is fixed to the clutch housing 22 by bolts or the like, whereby the insides of the casing and housing are communicated with each other. In the gear casing 150, the gears 65 and 66 are housed and supported laterally and engage with each other so as to transmit power from the output gear 63 in the clutch housing 22 to the input shaft 67a of the hydraulic pump 67. With regard to the gears 63, 65 and 66, a through hole 150a is opened longitudinally so as to penetrate the center of the intermediate gear 65 positioned at the middle between the main speed change shaft 60 which is an output shaft and the input shaft 67a. The intermediate shaft 64 supported by the gear casing 150 is inserted into the through hole 150a, whereby the intermediate gear 65 is rotatably supported by the intermediate shaft 64 through longitudinal taper roller-shaped bearings 353 and 354.

One of ends, a rear end 64a in this embodiment, of the intermediate shaft 64 is D-like shaped in section for instance, and the side flat surface of the rear end 64a touches a flat surface formed on the gear casing 150 partially as a detent. On the other hand, the other end of the intermediate shaft 64, that is, a front end 64b opposite to the hydraulic pump 67 is projected forward (outward) from the gear casing 150 and a screw is formed on the outer perimeter of the front end 64b so that a locknut 252 can be screwed thereto.

Between a spacer 351 and the rear end 64a, the taper roller-shaped bearing 353, a collar 255 and the bearing 354 are engaged with the longitudinal middle portion of the intermediate shaft 64. A front end of an inner ring 153a of the front bearing 353 touches the spacer 351, and a rear end of an inner ring 154a of the rear bearing 354 touches the end 64a through the collar 255. Then, the intermediate gear 65 is engaged with outsides of outer rings 153b and 154b of the bearings 353 and 354.

Outside the gear casing 150, the locknut 252 is screwed to the front end 64b of the intermediate shaft 64 so that the locknut 252 fixes the intermediate shaft 64 to the gear casing 150, and determines and fixes the position of the spacer 351. Seal members 257, 258 and 259 are between the intermediate shaft 64 and the spacer 351, between the intermediate shaft 64 and the gear casing 150, and between the spacer and the gear casing so as to prevent oil from leaking out.

According to this construction, by screwing the locknut 252, the spacer 351 is pushed into the gear casing 150 so that the spacer 351 pushes the inner rings 153a and 154a of the bearings 353 and 354 axially rearward, whereby the bearings 353 and 354 are pressed. Namely, by screwing the locknut 252 and making it move axially, the axial position of the spacer 351 can be changed so as to adjust the preload applied on the bearings 353 and 354.

Since the locknut 252 is arranged outside from the gear casing 150 as the above, the position of the spacer 351 can be adjusted by the locknut 252 from the outside of the gear casing 150 so as to adjust the preload applied on the bearings 353 and 354. Accordingly, at the manufactural work, the preload for the bearings 353 and 354 can be adjusted after providing the intermediate gear 65 into the gear casing 150, whereby the manufactural work becomes easy. Furthermore, the gear casing 150 is not necessary to be divided, whereby the gear casing can be miniaturized and the weight thereof can be saved. At the maintenance, the preload can be controlled without removing the gear casing 150 from the vehicle body, thereby improving maintainability.

Moreover, the locknut 252 adjusting the preload for the bearings 353 and 354 also fixes the intermediate shaft 64 to the gear casing 150, whereby any member fixing the intermediate shaft 64 is not required and the part number is reduced.

Figure 27:
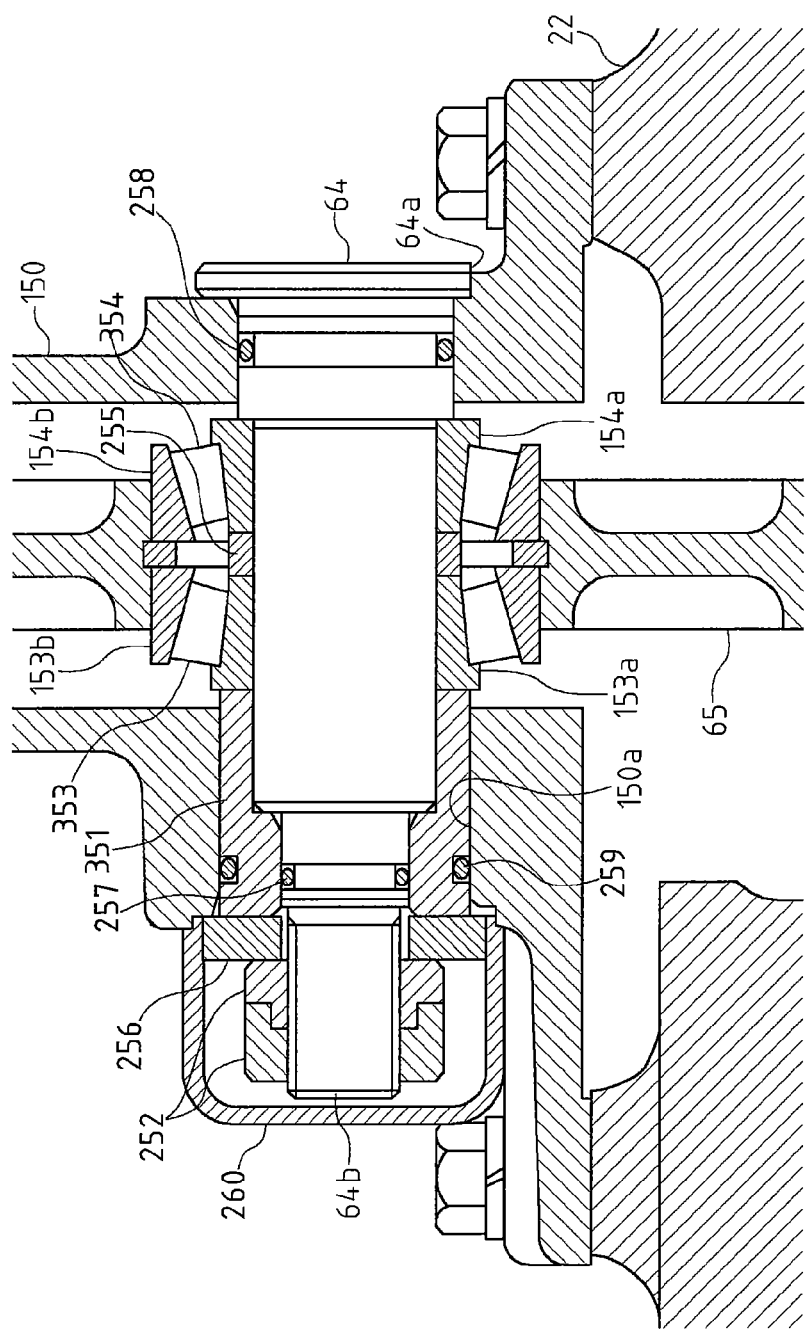
FIG. 27 is a drawing of a locknut covered by a cover.

By covering the locknut 252 by a cap 260 as shown in FIG. 27, the locknut 252 can be protected from muddy water of the outside and the like.

In addition, this construction can also be adopted to the case that power is taken off to the outer apparatuses through an opening provided on side, bottom or upper surface of the clutch housing or transmission casing. In the case that the transmission gear provided on the intermediate shaft is supported through taper roller bearing or thrust bearing engaged with the outside of the shaft, the shaft is projected through the surface opposite to the outer apparatuses attached to the gear casing and the screw part is formed on the projected part so as to adjust the preload.

Next, explanation will be given on the drive sprocket 11 in detail according to FIGS. 28, 29 and 30.

Figure 28:
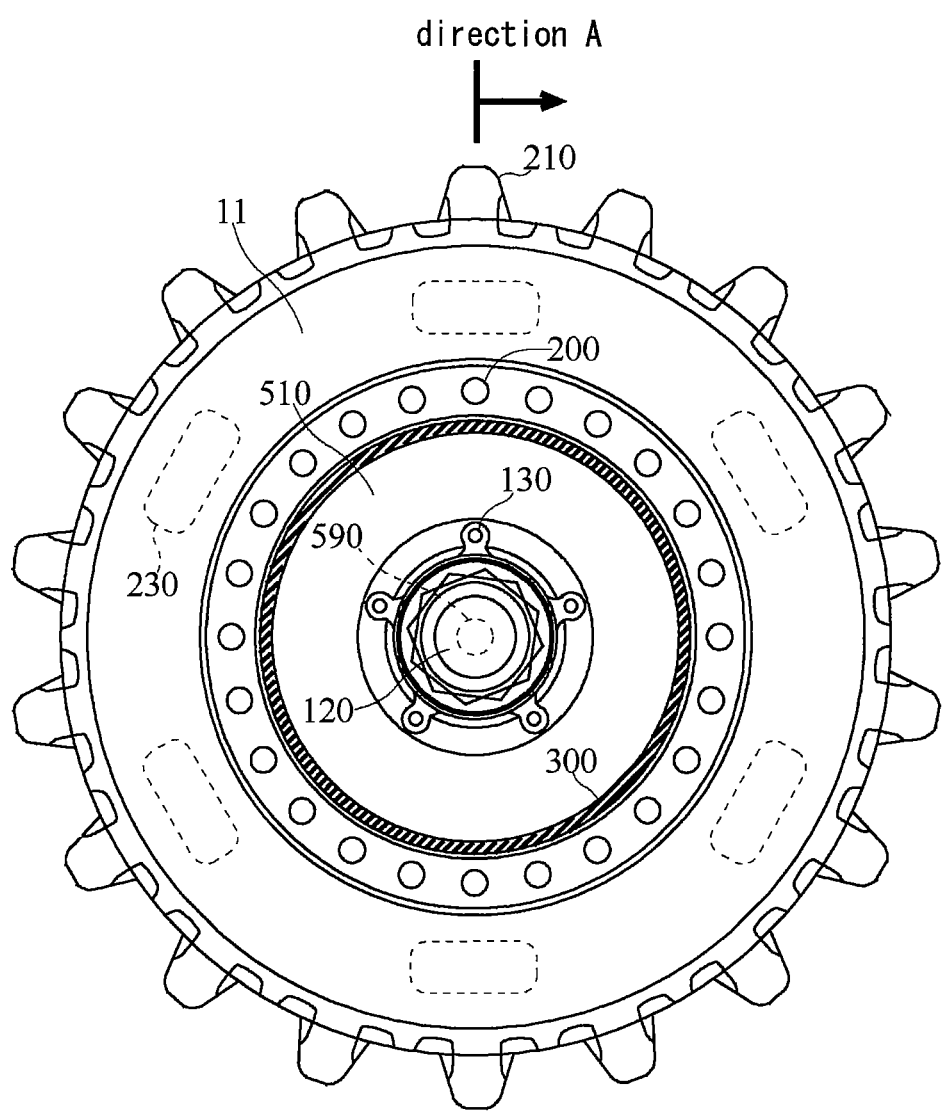
FIG. 28 is an enlarged side view of a drive sprocket of the crawler tractor.

FIG. 28 is an enlarged side view of the drive sprocket 11 similarly to FIG. 2. The crawler belt 14 and the like are omitted.

Figure 29:
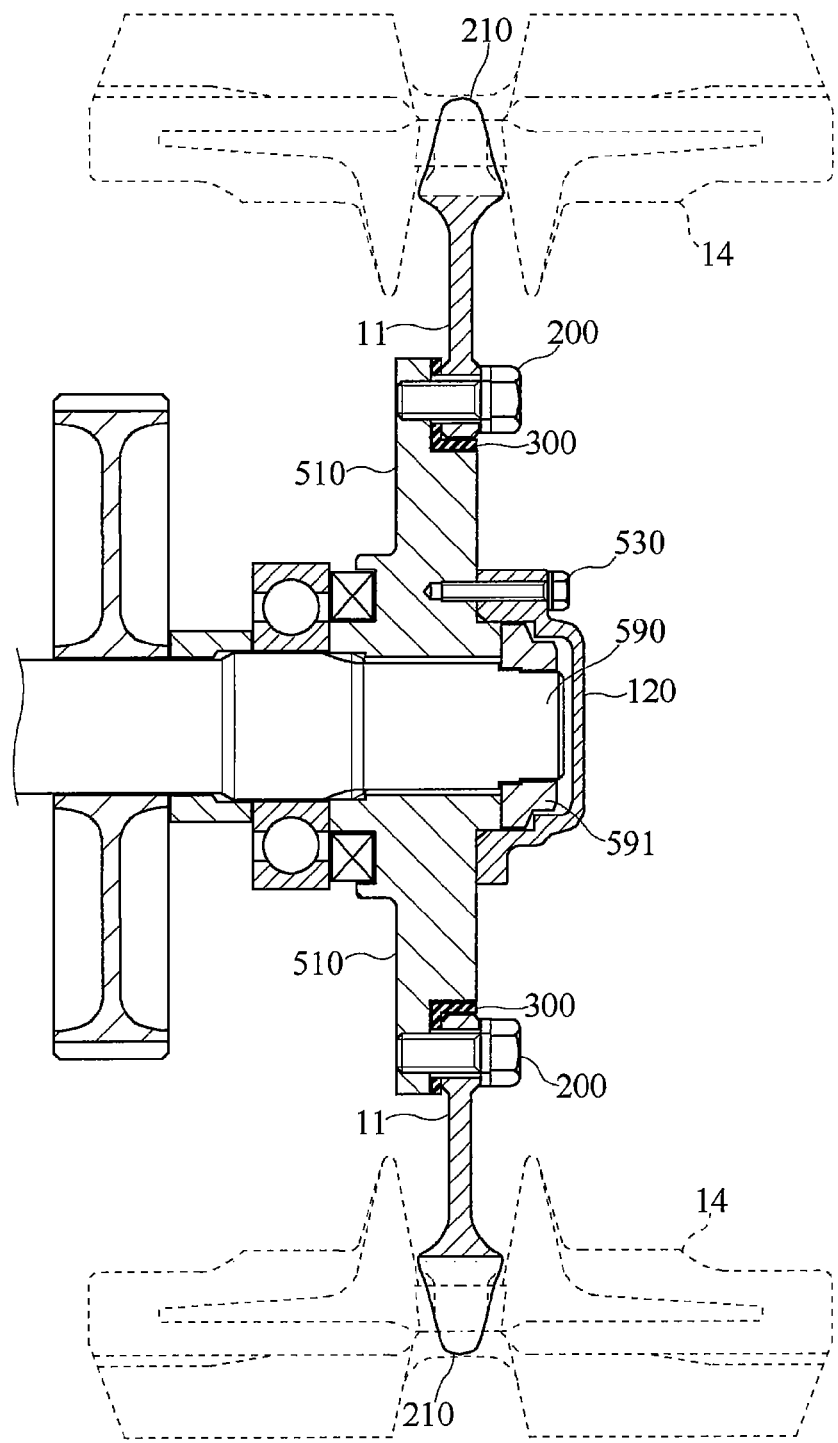
FIG. 29 is a sectional view of the drive sprocket of the crawler tractor.

FIG. 29 is a sectional view of the drive sprocket 11 viewed from the direction A in FIG. 28.

Figure 30:
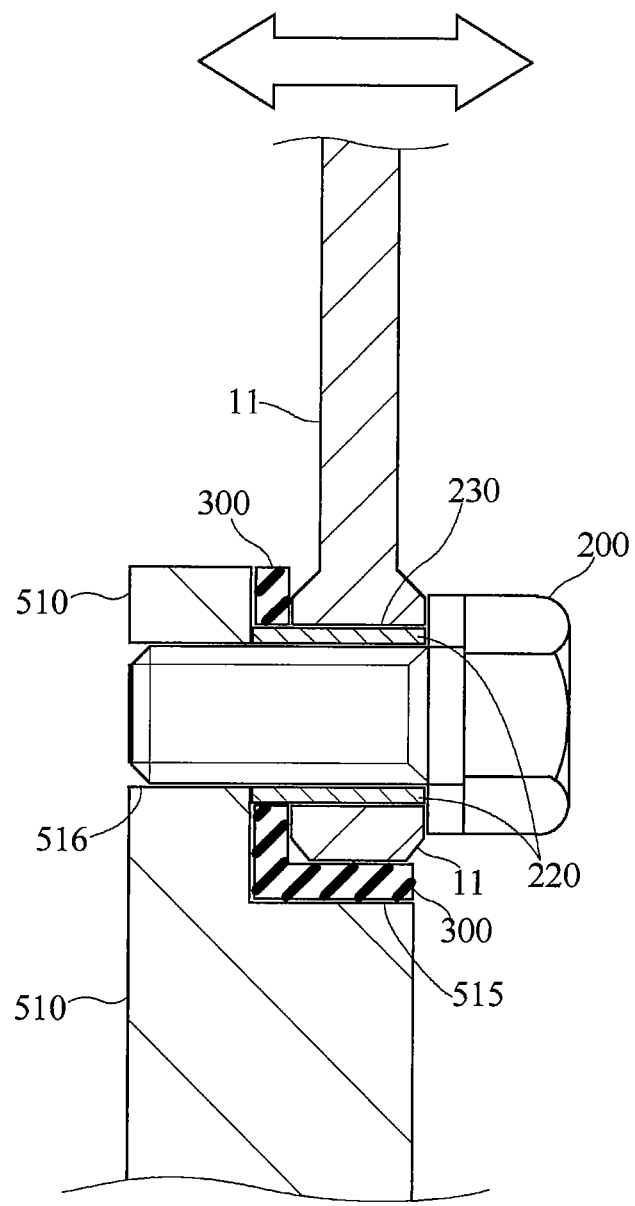
FIG. 30 is a detail drawing of attachment of the drive sprocket to a hub.

FIG. 30 is a detail drawing of attachment of the drive sprocket 11 shown in FIGS. 2 and 3 to a hub 510.

Firstly, schematic explanation will be given according to FIGS. 28 and 29.

The output from the engine 3 is transmitted through a power train (not shown) such as the clutch and the transmission to an output shaft 590.

In this case, as shown in FIGS. 1 and 2, the drive sprocket 11 which can be engaged with the crawler belt 14 is attached to the hub 510 penetrated by and fixed to the output shaft 590.

Accordingly, the rotation power transmitted to the output shaft 590 is transmitted to the drive sprocket 11.

Concretely, as shown in FIG. 30, the drive sprocket 11 is attached to the discal hub 510.

A circular hollow 515 to which the drive sprocket 11 can be attached is formed on the outer perimeter of the hub 510, and attachment holes 516 are formed in the hollow 515.

The positions of the holes 516 correspond with those of holes 230 formed on the inner peripheral side (central side) of the drive sprocket 11. By the holes, the drive sprocket 11 and the hub 510 are fastened with each other with bolts 200 or the like.

In this case, the inner peripheral surface of each of the holes 516 is threaded. This thread is engaged with the thread of the bolt 200 by screwing so that the drive sprocket 11 and the hub 510 are fastened with each other with the bolts 200.

Then, by engaging the drive sprocket 11 with the hollow 515 formed on the outer perimeter of the hub 510 and by fastening the holes 230 of the drive sprocket 11 to the holes 516 of the hub 510 while making the positions of the holes correspond with each other, the drive sprocket 11 can be attached to the hub 510.

Namely, by the above-mentioned construction, the drive sprocket 11 can be pivotally supported by the output shaft 590.

A cover 120 is fixed to the hub 510 by five bolts 530 so that the tip of the output shaft 590 is not exposed outside and a nut fastening and fixing the hub 510 to the output shaft 590 is prevented from slacking.

The hub 510 is spline-fitted to the output shaft 590.

With regard to the above-mentioned construction, a ring rubber vibration isolator 300 L-like shaped in section is attached to the hollow 515 as an example of a buffer member constructed by an elastic material such as rubber or resin. The drive sprocket 11 is attached to the hub 510 through the rubber vibration isolator 300.

Namely, the rubber vibration isolator 300 is interposed between the drive sprocket 11 and the hub 510 attaching the drive sprocket 11 to the shaft.

According to this construction, impact applied on the drive sprocket 11 is absorbed by the rubber vibration isolator 300, whereby the vibration of the vehicle caused by the impact from the field is suppressed.

Furthermore, by suppressing the vibration of the crawler tractor, the traveling speed of the crawler tractor can be raised so as to improve the working efficiency.

Projections 210 are provided on the outer perimeter of the drive sprocket 11 so as to be engaged with the crawler belt 14 (indicated by dotted lines in FIG. 29).

In addition, with regard to FIG. 28 and the like, considering the symmetrical shapes of the members and the viewability of the drawings, each of the bolts 200, the projections 210, the bolts 530 and the like which are plural are indicated by one numeral respectively. Hereinafter, numerals are omitted similarly.

In the case of attaching the drive sprocket 11 to the hub 510, a substantial cylindrical positioning collar 220 may be provided which covers the shaft part of the bolt 200 and is engaged with the hole 230 of the drive sprocket 11.

The positioning collar 220 is separated from the hub 510, the drive sprocket 11 and the rubber vibration isolator 300.

By engaging the positioning collar 220 with the bolt 200 from the outside, the positioning of the drive sprocket 11 against the hub 510 becomes easy and the inclination thereof is prevented, whereby the drive sprocket 11 can be fastened to the hub 510 easily by the bolt 200.

Therefore, the workability of the work fastening the drive sprocket 11 to the hub 510 is improved.

Though the bolt 200 is screwed to the hole 516 of the hub 510, the bolt 200, the hole 230 of the drive sprocket 11 and the positioning collar 220 are only engaged with each other.

Therefore, if impact is applied from the field, the drive sprocket 11 can be moved slightly along the direction of an outlined arrow shown in FIG. 30 (lateral direction), and the rubber vibration isolator 300 absorbs the vibration caused by the impact, whereby the vibration is suppressed efficiently.

Of course, in the case of longitudinal vibration, the lower surface of the L-like shaped rubber vibration isolator 300 (the central side surface of the hub 510) absorbs the vibration of the drive sprocket 11.

The hole 230 of the drive sprocket 11 may be formed substantially ovally.

By forming the hole 230 ovally, in the case of attaching the drive sprocket 11 to the hub 510, the hole 230 of the drive sprocket 11 can be positioned to correspond to the position of the hole 516 easily so that the drive sprocket 11 can be attached to the hub 510, whereby the fastening work by the bolt 200 becomes easy.

Furthermore, the later-discussed effect of absorbing impact can be obtained.

Figure 31:
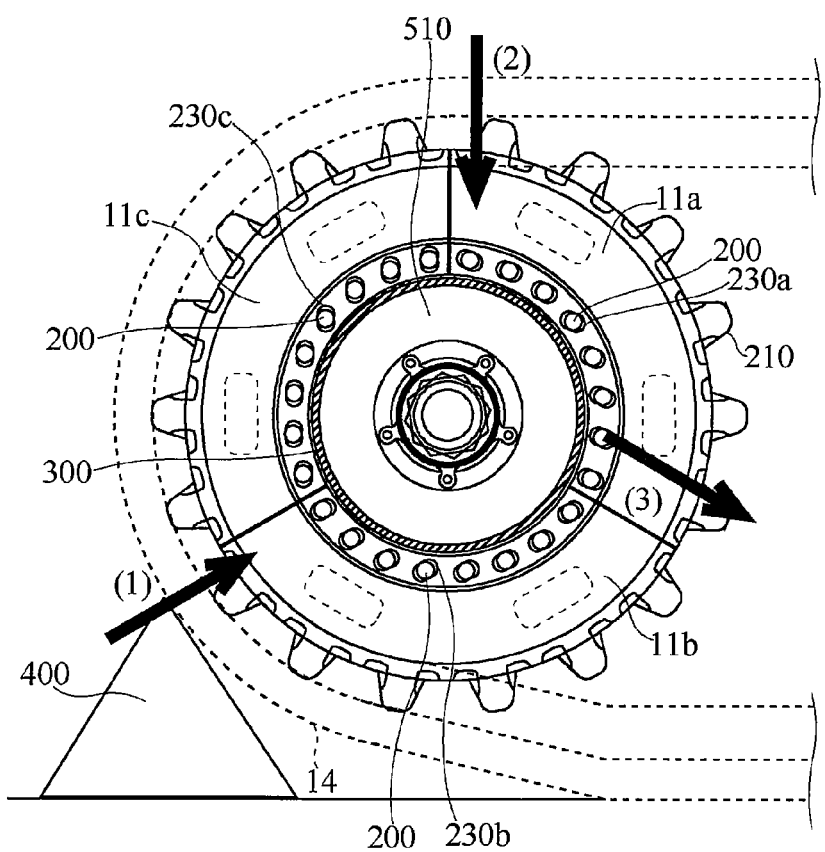
FIG. 31 is an explanation drawing of the case dividing the drive sprocket.

Next, for example as shown in FIG. 31, the drive sprocket 11 may be divided into three pieces (for every 120 degrees).

In this case, the drive sprocket 11 comprises three fan-shaped divided sprockets 11a, 11b and 11c.

Plural oval holes are formed in the attachment part of each of the divided sprockets 11a, 11b and 11c.

As shown in FIG. 31, with regard to each divided sprocket, the direction of the oval holes (the direction of the major axes of the oval holes) may be unified previously.

In this case, oval holes 230a correspond to the divided sprocket 11a, oval holes 230b correspond to the divided sprocket 11b, and oval holes 230c correspond to the divided sprocket 11c.

FIG. 30 shows a concrete example of providing eight oval holes in each divided sprocket. However, for plainly showing the drawings as mentioned above, each of the oval holes 230a, 230b and 230c are shown by one numeral.

The bolt 200 is inserted into each of the oval holes 230a, 230b and 230c.

For example, as shown in FIG. 31, the direction of the oval holes determined for each divided sprocket is determined so that if the crawler belt 14 touches an obstacle 400, the divided sprocket closest to the obstacle 400 moves slightly along the direction so as to absorb the impact.

Concretely, as shown in FIG. 31, the direction of the major axes of the oval holes 230b may be set so that if impact caused by the obstacle 400 is applied on the boundary between the divided sprockets 11b and 11c, the divided sprocket 11b moves slightly along the direction of an arrow (1) (the direction from the obstacle 400 to the center of the hub 510).

Namely, in the case that the divided sprocket is at the position of the divided sprocket 11b in FIG. 31, the direction of the major axes of the oval holes is in agreement with the direction of the impact caused by the obstacle 400 (the direction of an arrow (1)).

In this case, as shown in FIG. 31, though the divided sprocket 11b moves along the direction of an arrow (1), the rubber vibration isolator 300 absorbs the vibration, whereby the vibration on the crawler tractor is suppressed.

Since the divided sprocket is divided as the above, the sprocket can be removed easily from the hub 510 in the case of maintenance or exchange of the crawler belt 14 or the whole sprocket.

Namely, the sprocket is divided and the unit of the sprocket to be treated is made small. Accordingly, though the crawler belt 14 is attached to the crawler traveling unit 1, the divided sprocket not engaging with the crawler belt exists, whereby one divided unit of the sprocket can be removed from the hub 510.

Therefore, the conventional troublesome work is not required that the crawler belt 14 is completely removed once and then the maintenance or the like is performed.

Here, explanation has been given on the case of dividing the drive sprocket 11 into three pieces. However, by dividing the sprocket into a number of pieces other than three, the unit of the sprocket to be treated is also made small, whereby the same effect can be obtained.

In the case that the boundary between the divided sprockets 11a and 11c is at the side of the upper surface of the crawler belt 14, the load of the whole vehicle body is applied on the sprocket along an arrow (2) (vertical direction) through the output shaft 590, the hub 510 and the bolts 200.

The power direction of the arrow (2) is not in agreement with the direction of the major axis of each of the oval holes 230a, whereby the divided sprocket 11a doesn't move.

On the other hand, the power direction of the arrow (2) is in agreement with the direction of the major axis of each of the oval holes 230c. However, the divided sprocket 11c is restricted its movement by the divided sprocket 11b so as not to move downward.

Namely, the direction of the major axis of each of the oval holes is difference for each divided sprocket. Accordingly, if power is applied on one divided sprocket, the position of the divided sprocket is not changed unless the power direction is in agreement with the direction of the major axis of each of the oval holes.

Therefore, the three divided sprockets 11a to 11c don't move needlessly so as to disturb the wound state of the crawler belt 14. As a result, the vehicle can travel smoothly.

By providing the oval holes in each divided sprocket as above, each divided sprocket moves slightly by the above-mentioned power or another power (such as centrifugal force), whereby alignment is performed naturally so as to improve the whole divided sprockets.

Figure 32:
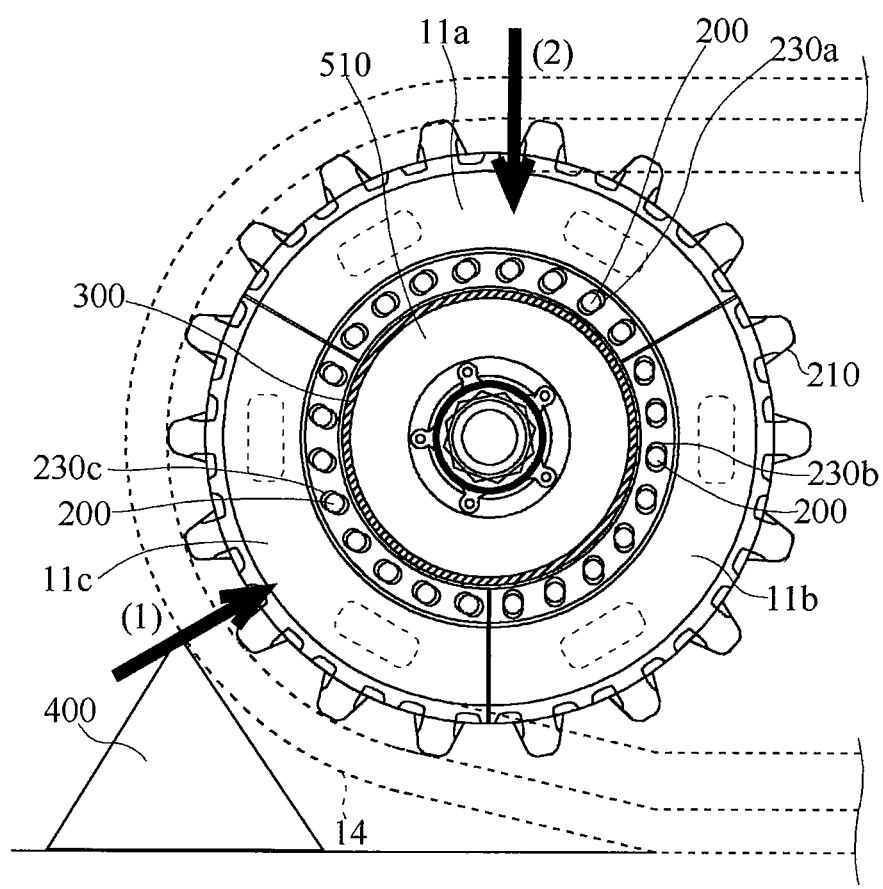
FIG. 32 is an explanation drawing of the case dividing the drive sprocket.

Next, FIG. 32 shows the state that the whole sprocket in FIG. 31 is rotated about 60 degrees counterclockwise.

FIG. 32 shows the state that the impact caused by the obstacle 400 is applied on the center of the outer perimeter of the divided sprocket 11c.

In this case, similarly to the case in FIG. 31, impact along the direction of an arrow (1) caused by the obstacle 400 is transmitted to the vicinity of the center of the outer perimeter of the divided sprocket 11c.

At this time, the divided sprocket 11c pretends to move toward the divided sprocket 11b along the major axis of each of the oval holes 230c. However, the movement direction is not in agreement with the major axis of each of the oval holes 230b of the divided sprocket 11b, whereby the divided sprocket 11c doesn't move.

In the case that the load of the traveling vehicle is applied on the divided sprocket 11a along an arrow (2) through the output shaft 590, the hub 510 and the bolts 200, the divided sprocket 11a pretends to move toward the divided sprocket 11c along the major axis of each of the oval holes 230a.

However, the movement direction is not in agreement with the major axis of each of the oval holes 230c of the divided sprocket 11c, whereby the divided sprocket 11a doesn't move after all.

As mentioned above, the divided sprocket 11b receives the power from the divided sprocket 11a and the like but doesn't move. On the other hand, the divided sprocket 11b pretends to move downward along the major axis of each of the oval holes 230b by its own weight. However, the divided sprocket 11b doesn't move after all by the elastic force of the rubber vibration isolator 300, the fastening force of the bolts 200 and the like.

In this case, each of the divided sprockets does not move fundamentally. However, the impact force is softened by the rubber vibration isolator 300 interposed between the hub 510 and each of the divided sprockets, whereby the vibration is suppressed.

INDUSTRIAL APPLICABILITY

The tractor according to the present invention has the crawler traveling unit and the weight of the power transmission system thereof is saved so that the mobility of the tractor is improved, thereby being useful industrially.

Furthermore, the turning transmission is provided in the tractor, the cooling efficiency of oil is improved, and the track rollers are elaborated so as to suppress the vibration. Accordingly, loss of work on the rough ground is reduced so as to improve the working efficiency, thereby being useful industrially.

The invention claimed is:

1. A vehicle comprising:
   a transmission casing arranged in a rear portion of a vehicle body;
   a front axle casing arranged in a front portion of the vehicle body, wherein power from an engine is transmitted from an output shaft supported by the transmission casing through a power transmission shaft to an input shaft supported by the front axle casing;
   a gear casing disposed between the transmission casing and the front axle casing, wherein:
   the gear casing is detachably attached to a clutch housing disposed before the transmission casing,
   the output shaft of the transmission casing and an input shaft of the gear casing are arranged coaxially, and
   the input shaft of the front axle casing and an output shaft of the gear casing are arranged coaxially; and
   a crawler traveling unit including:
   a drive sprocket,
   an idler,
   a track roller provided between the drive sprocket and the idler,
   a crawler belt wound around the drive sprocket, the idler and the track roller, and
   a shaft rotatably supporting the track roller, wherein the shaft rotatably supporting the track roller is divided into parts along an axial direction of the shaft, and wherein the parts are connected to each other through an elastic member.

2. A vehicle as set forth in claim 1, wherein a differential mechanism is disposed in the front portion of the vehicle and comprises:
   a differential connecting left and right output shafts, supported by the front axle casing, through a pair of planetary gear mechanisms;
   a turning hydrostatic transmission, giving difference of rotation speed on the output shafts through the planetary gear mechanisms so as to perform turning of the vehicle; and
   a mechanical turning transmission, changing power from the turning hydrostatic transmission in speed and then transmitting the power to the differential.

3. A vehicle as set forth in claim 2, wherein the mechanical turning transmission is a hydraulic-clutch type turning transmission.

4. A vehicle as set forth in claim 3, wherein the turning transmission is interlockingly connected to a sub transmission disposed in the transmission casing.

5. A vehicle as set forth in claim 1, wherein:
power from the engine mounted on the vehicle is transmitted to a hydraulic clutch type forward/rearward traveling switching device and a main transmission;
subsequently the power is transmitted to a sub transmission and changed in speed, and then traveling drive is performed;
a turning hydrostatic transmission is actuated so as to control turning of the vehicle; and
pressure oil is returned from the turning hydrostatic transmission through an oil cooler to the transmission casing.

6. A vehicle as set forth in claim 1, wherein:
power from the engine mounted on the vehicle is transmitted to a hydraulic clutch type forward/rearward traveling switching device and a main transmission;
subsequently the power is transmitted to a sub transmission and changed in speed, and then traveling drive is performed;
a turning hydrostatic transmission is actuated so as to control turning of the vehicle; and
pressure oil returning from the turning hydrostatic transmission is supplied through an oil cooler to frictional boards of a hydraulic clutch of the forward/rearward traveling switching device.

7. A vehicle as set forth in claim 1, wherein ends of the divided shafts are shaped so as to engage with each other.

8. A vehicle as set forth in claim 7, wherein the ends of the divided shafts are shaped so as to mesh with each other.

9. A vehicle as set forth in claim 1, wherein the shaft rotatably supporting the track roller supports the track roller through a bearing.

10. A vehicle as set forth in claim 1, wherein the shaft rotatably supporting the track roller is divided along the axial direction of the shaft into a first part, a second part, and a third part, and wherein a first elastic member connects the first part and the second part and a second elastic member connects the second part and the third part.

11. A vehicle comprising:
a transmission casing arranged in a rear portion of a vehicle body;
a front axle casing arranged in a front portion of the vehicle body, wherein power from an engine is transmitted from an output shaft supported by the transmission casing through a power transmission shaft to an input shaft supported by the front axle casing;
a gear casing disposed between the transmission casing and the front axle casing, wherein:
the gear casing is constructed integrally with a flywheel casing disposed behind the engine,
the output shaft of the transmission casing and an input shaft of the gear casing are arranged coaxially, and
the input shaft of the front axle casing and an output shaft of the gear casing are arranged coaxially; and
a crawler traveling unit including:
a drive sprocket,
an idler,
a track roller provided between the drive sprocket and the idler,
a crawler belt wound around the drive sprocket, the idler and the track roller, and
a shaft rotatably supporting the track roller, wherein the shaft rotatably supporting the track roller is divided into parts along an axial direction of the and wherein the parts are connected to each other through an elastic member.

12. A vehicle as set forth in claim 11, wherein a differential mechanism disposed in the front portion of the vehicle comprises:
a differential connecting left and right output shafts, supported by the front axle casing, through a pair of planetary gear mechanisms;
a turning hydrostatic transmission, giving difference of rotation speed on the output shafts through the planetary gear mechanisms so as to perform turning of the vehicle; and
a mechanical turning transmission, changing power from the turning hydrostatic transmission in speed and then transmitting the power to the differential.

13. A vehicle as set forth in claim 12, wherein the mechanical turning transmission is a hydraulic-clutch type turning transmission.

14. A vehicle as set forth in claim 12, wherein the turning transmission is interlockingly connected to a sub transmission disposed in the transmission casing.

15. A vehicle as set forth in claim 11, wherein:
power from the engine mounted on the vehicle is transmitted to a hydraulic clutch type forward/rearward traveling switching device and a main transmission;
subsequently the power is transmitted to a sub transmission and changed in speed, and then traveling drive is performed;
a turning hydrostatic transmission is actuated so as to control turning of the vehicle; and
pressure oil is returned from the turning hydrostatic transmission through an oil cooler to the transmission casing.

16. A vehicle as set forth in claim 11, wherein:
power from the engine mounted on vehicle is transmitted to a hydraulic clutch type forward/rearward traveling switching device and a main transmission;
subsequently the power is transmitted to a sub transmission and changed in speed, and then traveling drive is performed;
a turning hydrostatic transmission is actuated so as to control turning of the vehicle; and
pressure oil returning from the turning hydrostatic transmission is supplied through an oil cooler to frictional boards of a hydraulic clutch of the forward/rearward traveling switching device.

17. A vehicle as set forth in claim 11, wherein ends of the divided shafts are shaped so as to engage with each other.

18. A vehicle as set forth in claim 17, wherein the ends of the divided shafts are shaped so as to mesh with each other.

19. A vehicle as set forth in claim 11, wherein the shaft rotatably supporting the track roller supports the track roller through a bearing.

20. A vehicle as set forth in claim 11, wherein the shaft rotatably supporting the track roller is divided along the axial direction of the shaft into a first part, a second part, and a third part, and wherein a first elastic member connects the first part and the second part and a second elastic member connects the second part and the third part.

* * * * *

UNITED STATES PATENT AND TRADEMARK OFFICE
CERTIFICATE OF CORRECTION

PATENT NO. : 8,517,139 B2  
APPLICATION NO. : 10/597506  
DATED : August 27, 2013  
INVENTOR(S) : Masakazu Komatsu Page 1 of 1

It is certified that error appears in the above-identified patent and that said Letters Patent is hereby corrected as shown below:

On the Title Page, Item (56) (Foreign Patent Documents), last sentence, "7/2008" should be replaced with --7/2005--; and In the Claims Column 32, line 5, Claim 11: "axial direction of the and" should be --axial direction of the shaft, and--.

Signed and Sealed this
Sixth Day of May, 2014

Michelle K. Lee
*Deputy Director of the United States Patent and Trademark Office*